(12) United States Patent
Dendel et al.

(10) Patent No.: US 8,662,315 B2
(45) Date of Patent: Mar. 4, 2014

(54) ROTARY FAN PRESS

(75) Inventors: Joseph W. Dendel, Allegan, MI (US);
Roger J. Tyria, Plainwell, MI (US)

(73) Assignee: Prime Solution, Inc., Allegan, MI (US)

( * ) Notice: Subject to any disclaimer, the term of this patent is extended or adjusted under 35 U.S.C. 154(b) by 844 days.

(21) Appl. No.: 12/501,665

(22) Filed: Jul. 13, 2009

(65) Prior Publication Data

US 2010/0012573 A1  Jan. 21, 2010

Related U.S. Application Data

(60) Provisional application No. 61/134,857, filed on Jul. 14, 2008.

(51) Int. Cl.
*B01D 33/15* (2006.01)
*B30B 9/02* (2006.01)
*B30B 9/20* (2006.01)
*B30B 9/26* (2006.01)

(52) U.S. Cl.
USPC ........ 210/359; 210/380.3; 210/396; 210/327; 100/116; 100/104; 100/111; 100/112; 100/126

(58) Field of Classification Search
USPC ........... 210/380.1, 380.3, 396, 393, 391, 359, 210/324, 327, 330, 350, 352, 386, 636, 767, 210/780, 173, 174, 768, 770, 402–407, 398, 210/400–401; 100/112, 104, 110, 116, 126, 100/127, 130, 37, 223
See application file for complete search history.

(56) References Cited

U.S. PATENT DOCUMENTS

| | | | |
|---|---|---|---|
| 1,018,267 | A | 2/1912 | Rach |
| 1,610,431 | A | 12/1926 | D'Olier |
| 1,631,585 | A | 6/1927 | D'Olier et al. |
| 1,717,313 | A | 6/1929 | D'Olier |
| 2,003,664 | A | 6/1935 | Govers |

(Continued)

FOREIGN PATENT DOCUMENTS

| | | |
|---|---|---|
| EP | 0307700 | 3/1989 |
| EP | 0761692 | 3/1997 |

(Continued)

OTHER PUBLICATIONS

English language machine translation of JP 4051395 B1.*

(Continued)

*Primary Examiner* — David C Mellon
(74) *Attorney, Agent, or Firm* — Flynn, Thiel, Boutell & Tanis, P.C.

(57) ABSTRACT

A liquid extraction assembly for extracting liquid from a mass comprising a housing having an inlet and an outlet and a path therebetween. The housing includes a rotating screen adjacent the path. The housing can have a nozzle at the inlet. The housing can include an inflatable member providing a seal adjacent the screen for maintaining the mass in the path. The housing can include a center seal rotating with the screen and a fixed scraper in the path and adjacent the at least one rotating screen, with the center seal including a notch for accepting a tip of the scraper therein. The housing can also include side walls and an annular seal located between the side walls, with the annular seal defining an outer periphery of the path and having a rotating top end portion allowing an area of the outlet to change.

6 Claims, 40 Drawing Sheets

(56) References Cited

U.S. PATENT DOCUMENTS

| | | | |
|---|---|---|---|
| 2,045,740 | A | 6/1936 | Wilson et al. |
| 2,084,229 | A | 6/1937 | Van Maanen |
| 2,103,483 | A | 12/1937 | McNeal |
| 2,127,270 | A | 8/1938 | Schaaf |
| 2,146,158 | A | 2/1939 | Scherer |
| 2,149,017 | A | 2/1939 | Gordon |
| 2,354,752 | A | 8/1944 | Hellan |
| 2,419,155 | A | 4/1947 | Orton, Jr. |
| 2,545,144 | A | 3/1951 | Green et al. |
| 2,793,583 | A | 5/1957 | Messing |
| 3,053,171 | A | 9/1962 | Asplund |
| 3,277,814 | A | 10/1966 | Malm et al. |
| 3,288,293 | A | 11/1966 | Essel |
| 3,741,388 | A | 6/1973 | Takahashi |
| 3,769,904 | A | 11/1973 | Yoritomi |
| 3,774,528 | A | 11/1973 | Reinhall |
| 3,882,025 | A | 5/1975 | Talley, Jr. |
| 3,948,165 | A * | 4/1976 | Seifert ............... 100/116 |
| 4,099,458 | A | 7/1978 | Seifert |
| 4,111,115 | A | 9/1978 | Cory |
| 4,139,467 | A | 2/1979 | Fritzvold et al. |
| 4,534,868 | A | 8/1985 | Barbulescu et al. |
| 4,565,602 | A | 1/1986 | Haartti et al. |
| 4,580,961 | A | 4/1986 | Jensen |
| 4,673,496 | A * | 6/1987 | Turner, Jr. ............... 210/232 |
| 4,986,881 | A | 1/1991 | Funk |
| 5,045,046 | A | 9/1991 | Bond |
| 5,053,123 | A | 10/1991 | Clarke-Pounder et al. |
| 5,087,358 | A | 2/1992 | Massignani |
| 5,205,941 | A | 4/1993 | Funk et al. |
| 5,213,686 | A | 5/1993 | Funk et al. |
| 5,344,575 | A | 9/1994 | Boulet et al. |
| 5,354,256 | A | 10/1994 | Knelson |
| 5,417,856 | A | 5/1995 | Bacher et al. |
| 5,456,828 | A | 10/1995 | Tersi et al. |
| 5,566,611 | A | 10/1996 | Scheucher et al. |
| 5,577,674 | A | 11/1996 | Altonji et al. |
| 5,582,724 | A | 12/1996 | Rogers et al. |
| 5,582,726 | A | 12/1996 | Feller et al. |
| 5,618,423 | A | 4/1997 | Lin |
| 5,709,801 | A | 1/1998 | Murofushi et al. |
| 5,885,461 | A | 3/1999 | Tetrault et al. |
| 6,004,468 | A | 12/1999 | Barbulescu et al. |
| 6,042,735 | A | 3/2000 | Gommel et al. |
| 6,165,323 | A | 12/2000 | Shearer |
| 6,206,204 | B1 | 3/2001 | Aikawa |
| 6,241,890 | B1 | 6/2001 | Clay et al. |
| 6,284,145 | B1 | 9/2001 | Andersson |
| 6,344,112 | B1 | 2/2002 | Hernesniemi |
| 6,346,069 | B1 | 2/2002 | Collier |
| 6,461,507 | B1 | 10/2002 | Ishigaki et al. |
| 6,615,710 | B1 | 9/2003 | Ishigaki et al. |
| 7,166,229 | B2 | 1/2007 | Cote et al. |

FOREIGN PATENT DOCUMENTS

| | | |
|---|---|---|
| JP | 57019197 | 2/1982 |
| JP | 20010581047 | 3/2001 |
| JP | 2001113109 | 4/2001 |
| JP | 2001129316 A | 5/2001 |
| JP | 2001129318 A | 5/2001 |
| JP | 02002210308 A | 7/2002 |
| JP | 2004074066 | 3/2004 |
| JP | 2004209438 | 7/2004 |
| JP | 2004291036 | 10/2004 |
| JP | 4051395 B1 * | 2/2008 |
| WO | 9416879 | 8/1994 |
| WO | 0126776 | 4/2001 |
| WO | 03004130 | 1/2003 |
| WO | 2006020543 | 2/2006 |

OTHER PUBLICATIONS

Office Action mailed Jun. 26, 2008 in U.S. Appl. No. 11/573,402.
Response filed Sep. 26, 2008 in U.S. Appl. No. 11/573,402.
Office Action mailed Dec. 30, 2008 in U.S. Appl. No. 11/573,402.
Amendment filed Jun. 12, 2009 in U.S. Appl. No. 11/573,402.
Appeal Brief filed Jun. 25, 2009 in U.S. Appl. No. 11/573,402.
Amendment filed Jun. 25, 2009 in U.S. Appl. No. 11/573,402.
Notice of Allowance mailed Oct. 9, 2009 in U.S. Appl. No. 11/573,402.
Amendment filed Nov. 23, 2009 in U.S. Appl. No. 11/573,402.
Petition and RCE filed Jan. 7, 2010 in U.S. Appl. No. 11/573,402.
Office Action mailed Apr. 29, 2010 in U.S. Appl. No. 11/573,402.
Response filed Jun. 10, 2010 in U.S. Appl. No. 11/573,402.
Notice of Allowance mailed Jul. 1, 2010 in U.S. Appl. No. 11/573,402.
Office Action mailed May 21, 2010 in U.S. Appl. No. 12/581,509.
Response filed Aug. 20, 2010 in U.S. Appl. No. 12/581,509.
Office Action mailed Jan. 21, 2010 in U.S. Appl. No. 12/091,184.
Response filed Apr. 19, 2010 in U.S. Appl. No. 12/091,184.
Office Action mailed Jun. 2, 2010 in U.S. Appl. No. 12/091,184.
Response filed Jul. 30, 2010 in U.S. Appl. No. 12/091,184.
Notice of Allowance mailed Nov. 18, 2010 in U.S. Appl. No. 12/091,184.
Office Action mailed Jun. 3, 2010 in U.S. Appl. No. 11/554,279.
Response filed Sep. 30, 2010 in U.S. Appl. No. 11/554,279.

* cited by examiner

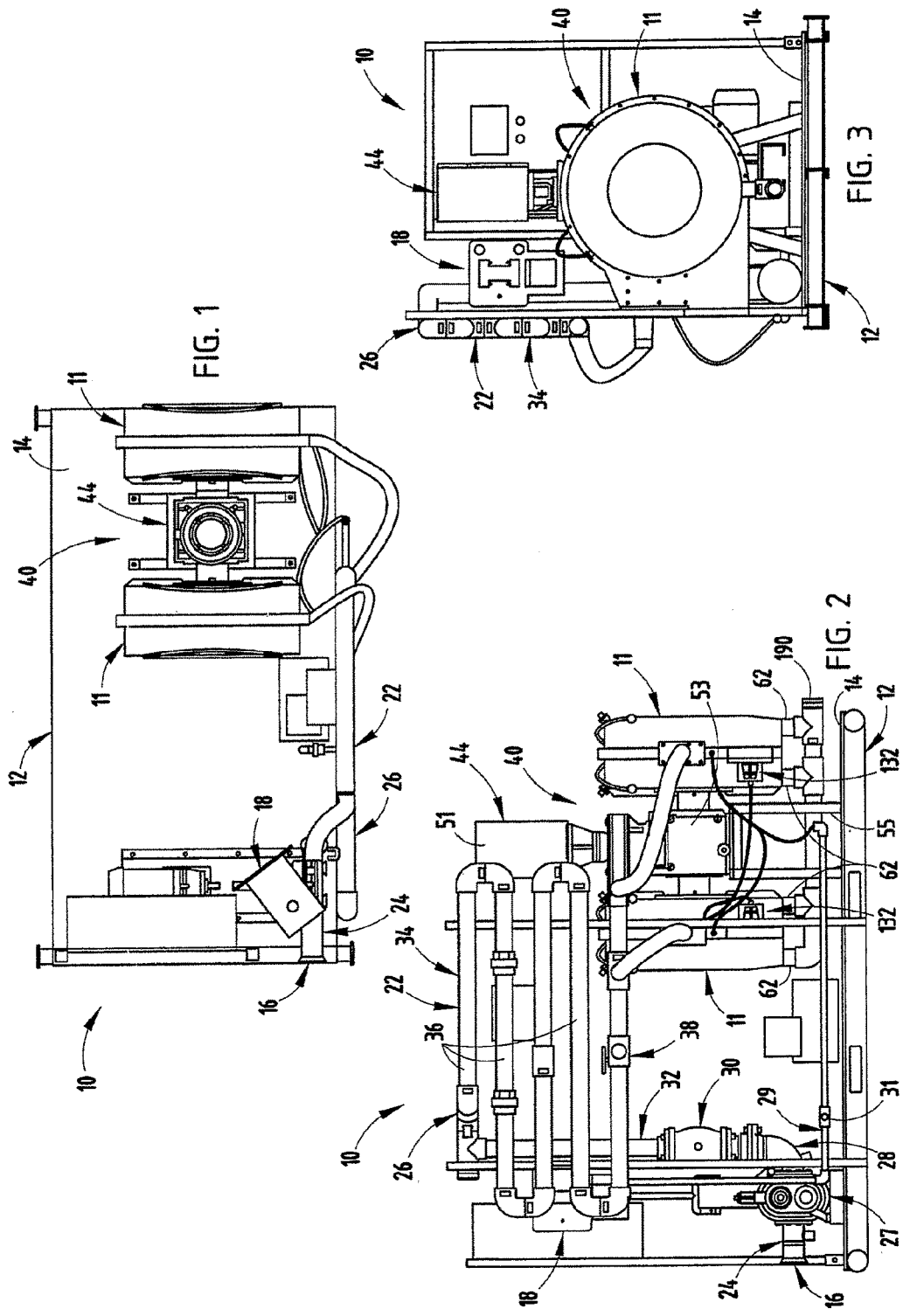

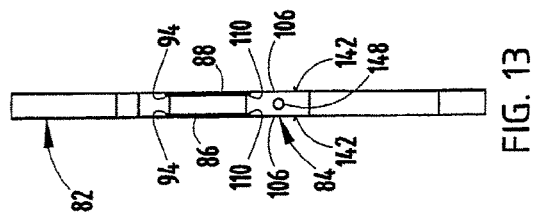
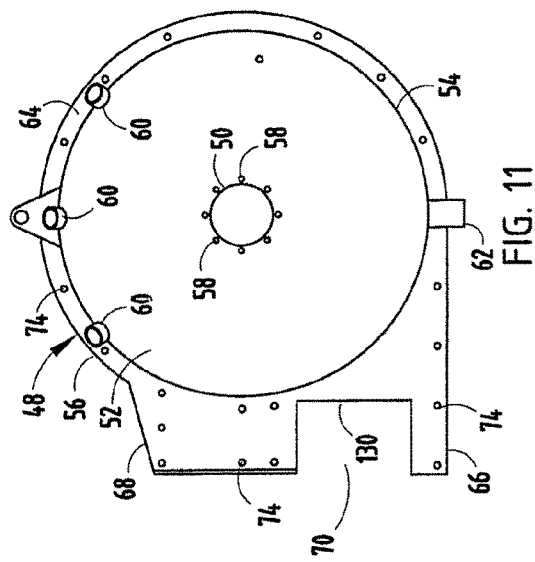
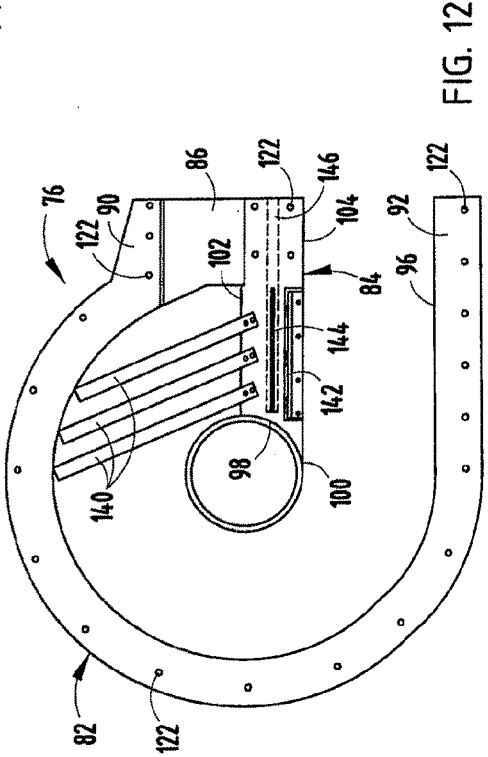
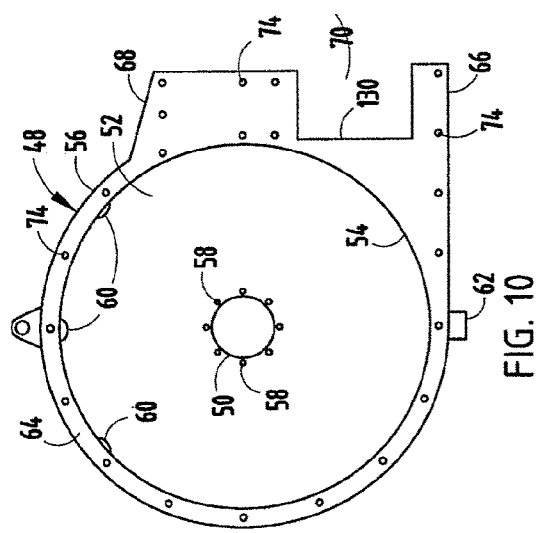

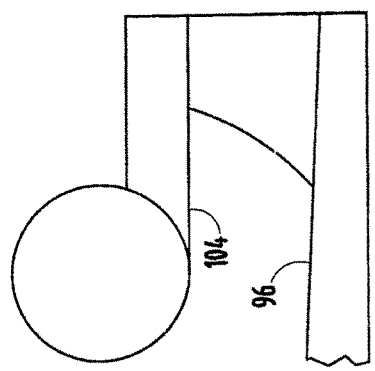
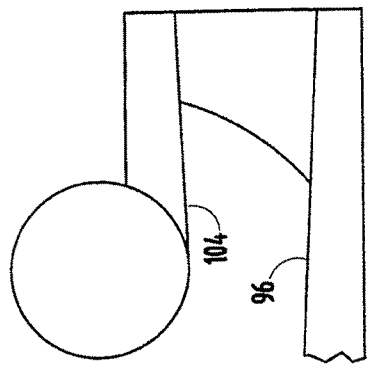
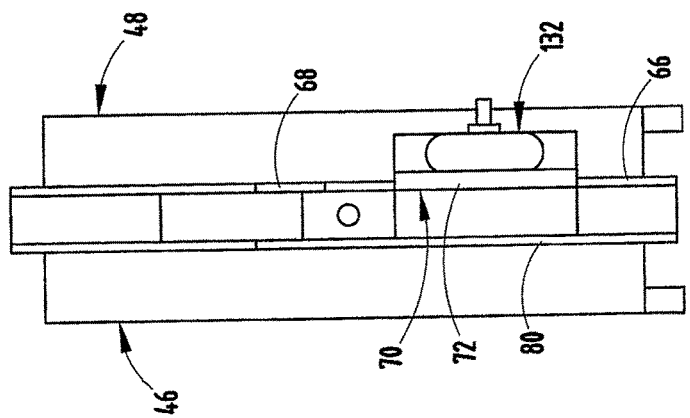
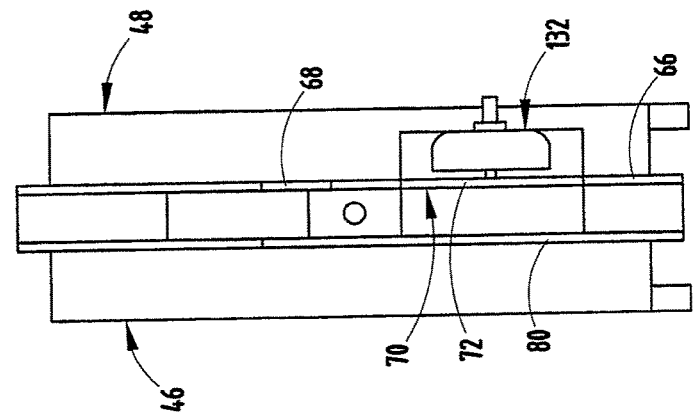

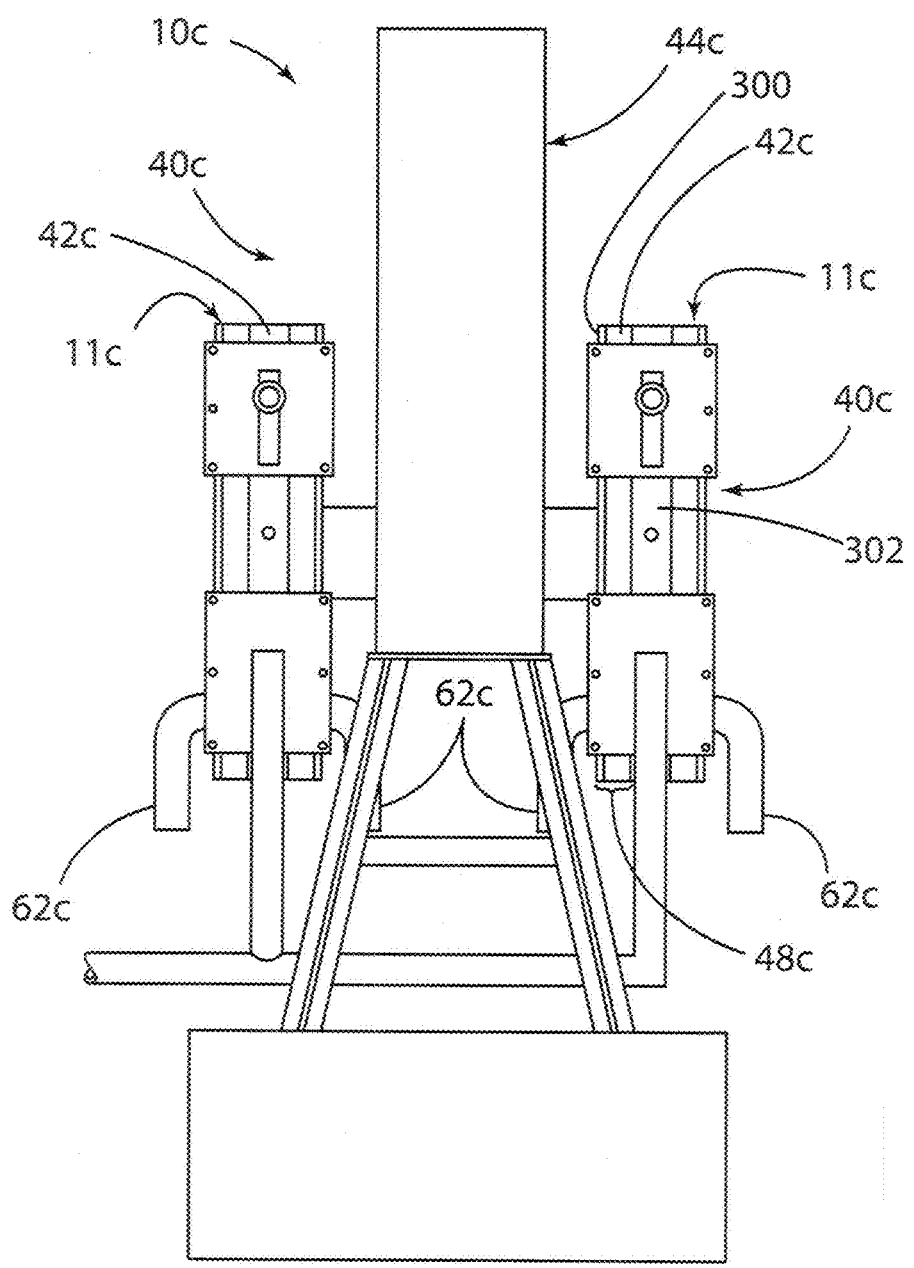

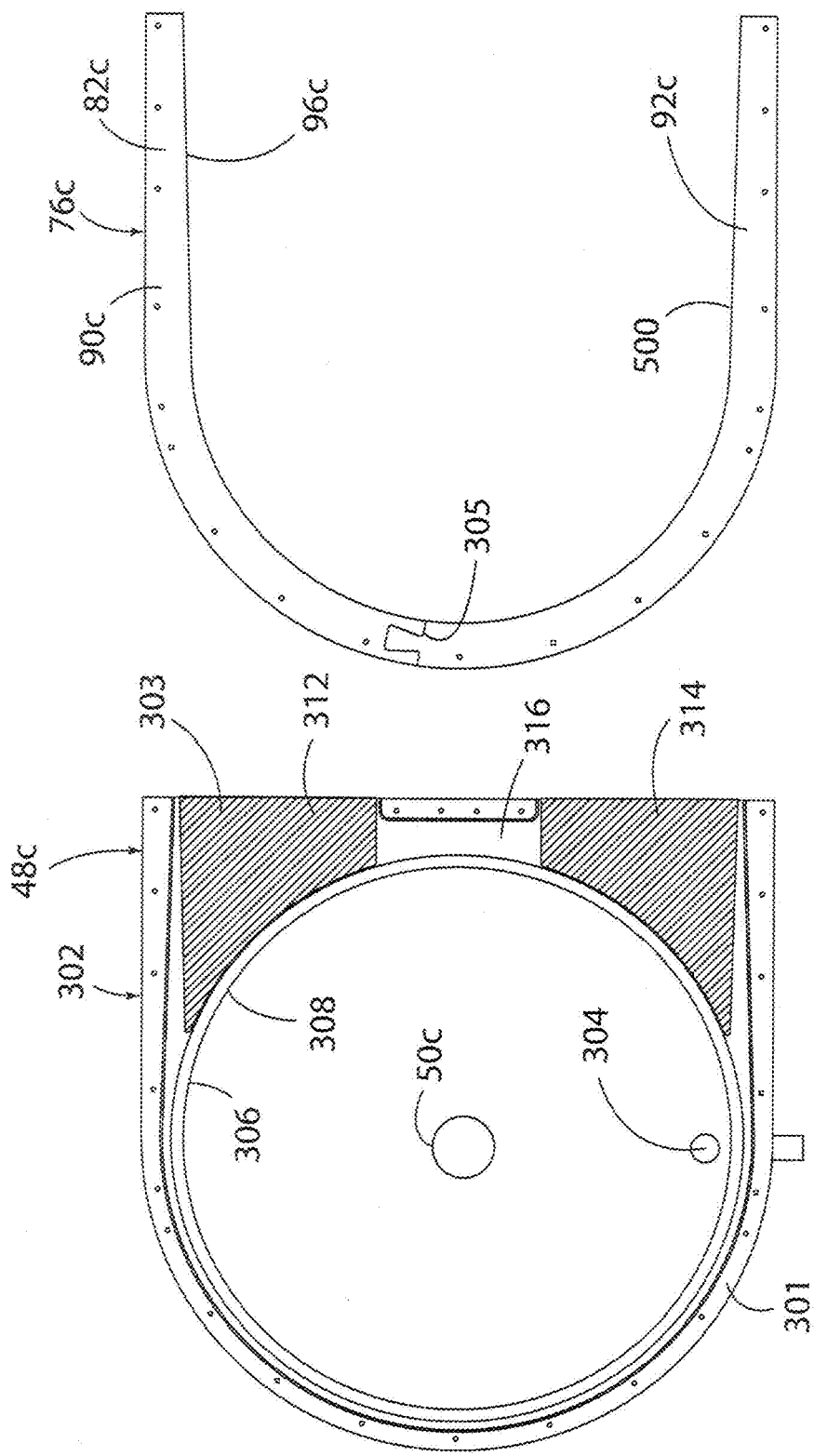

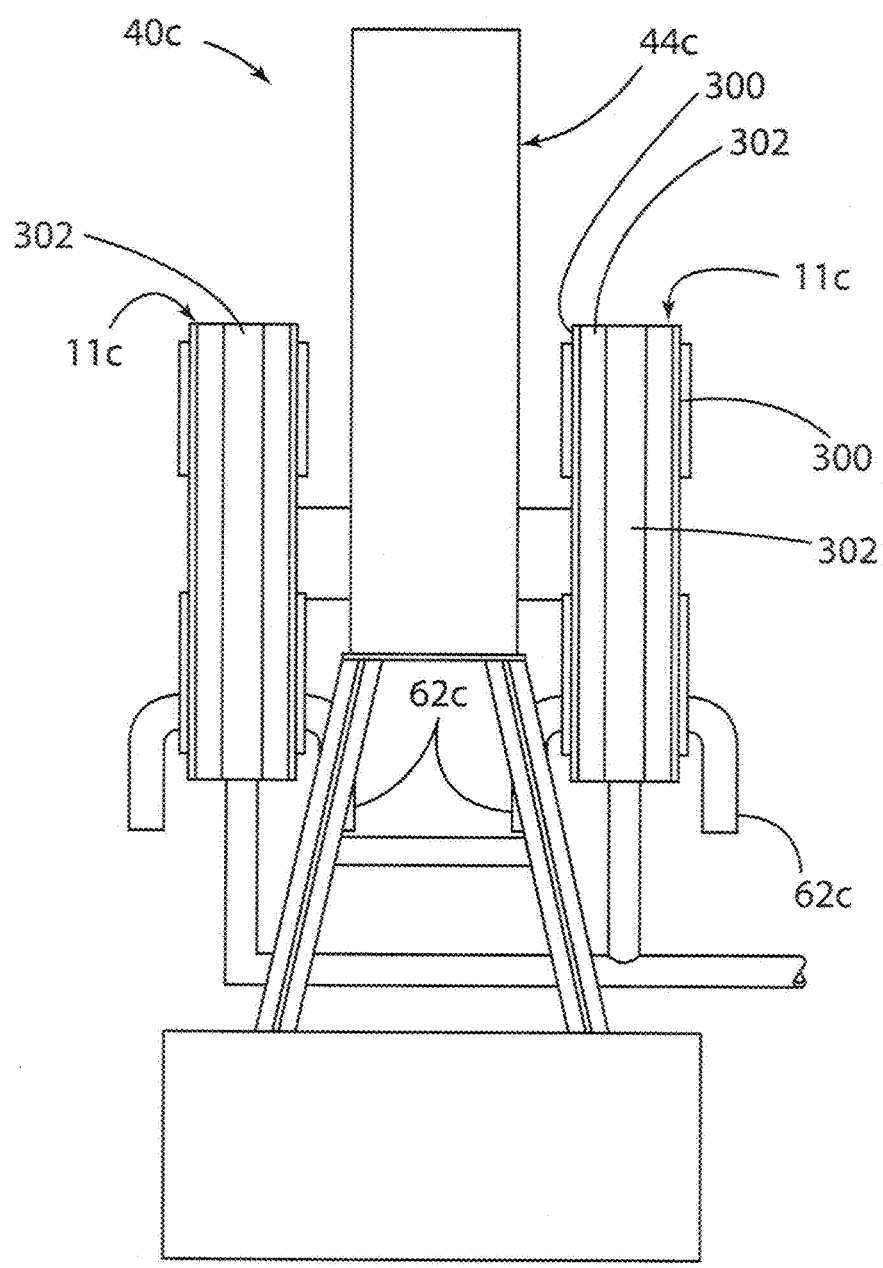

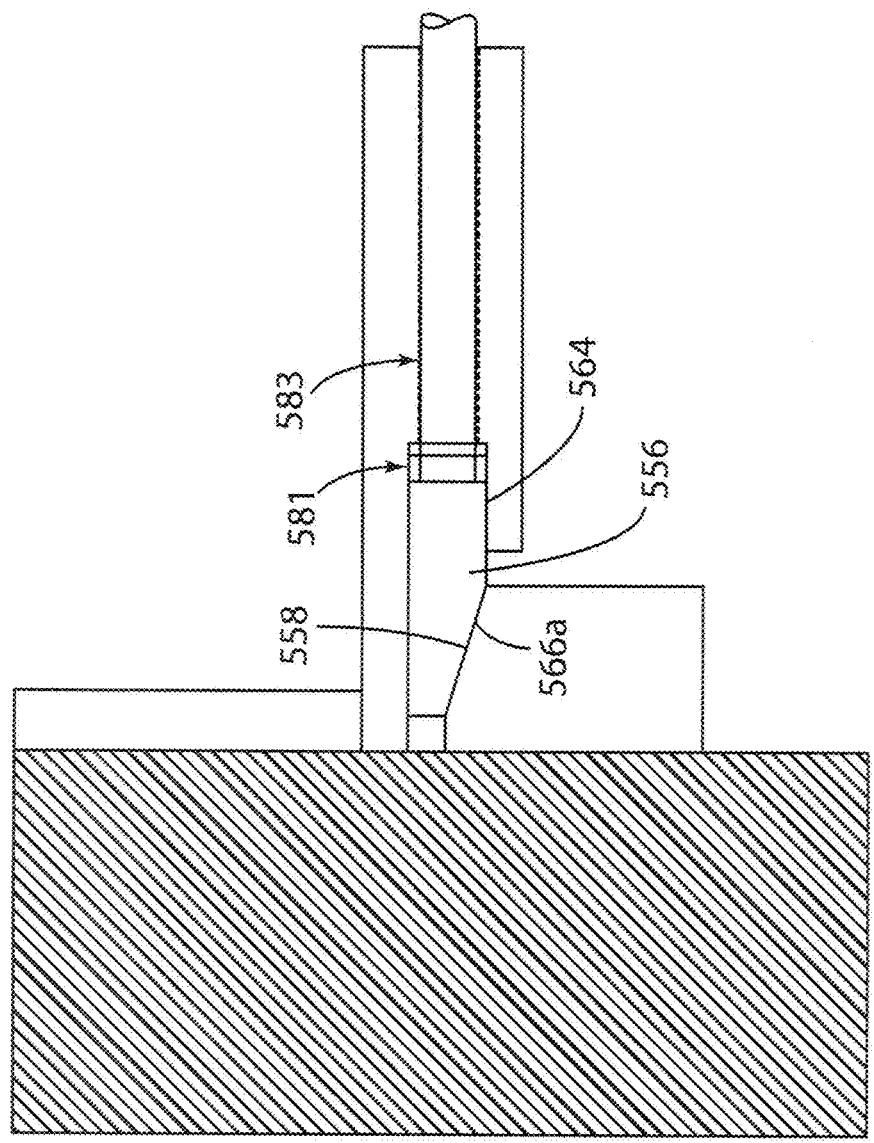

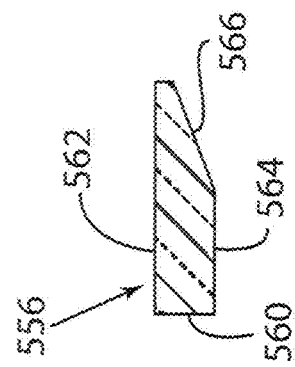
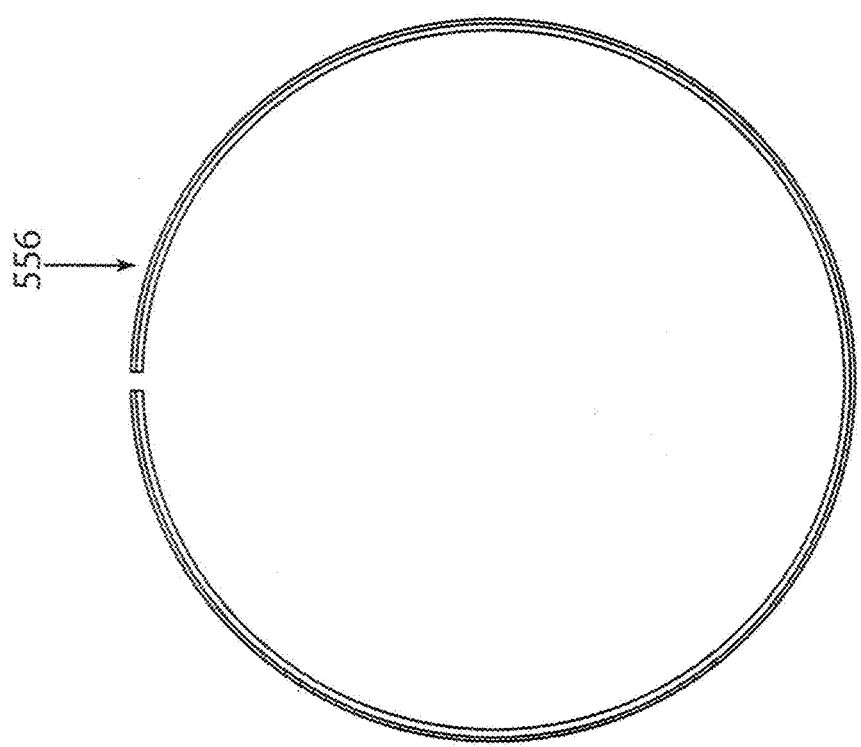
FIG. 33B
FIG. 33A

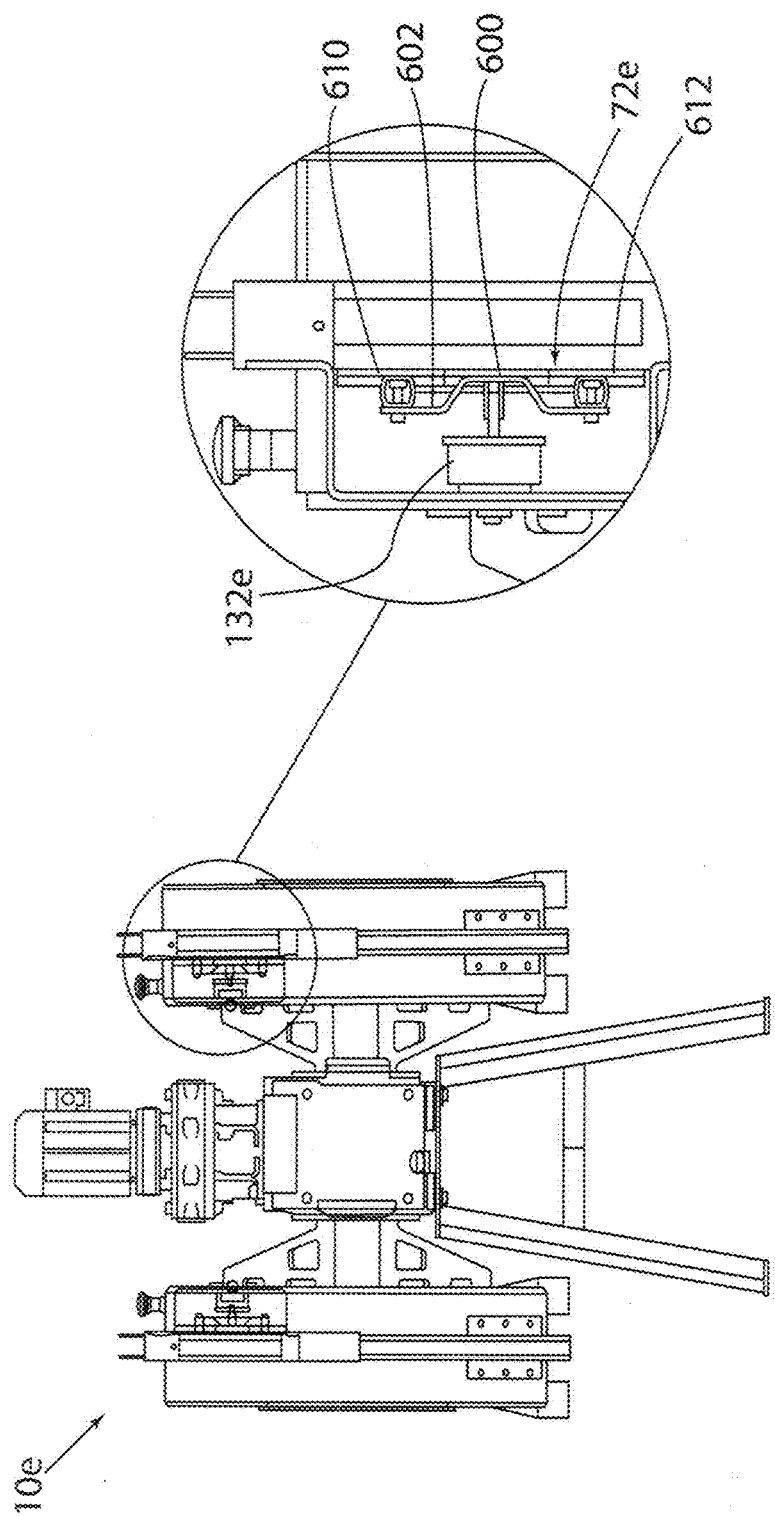

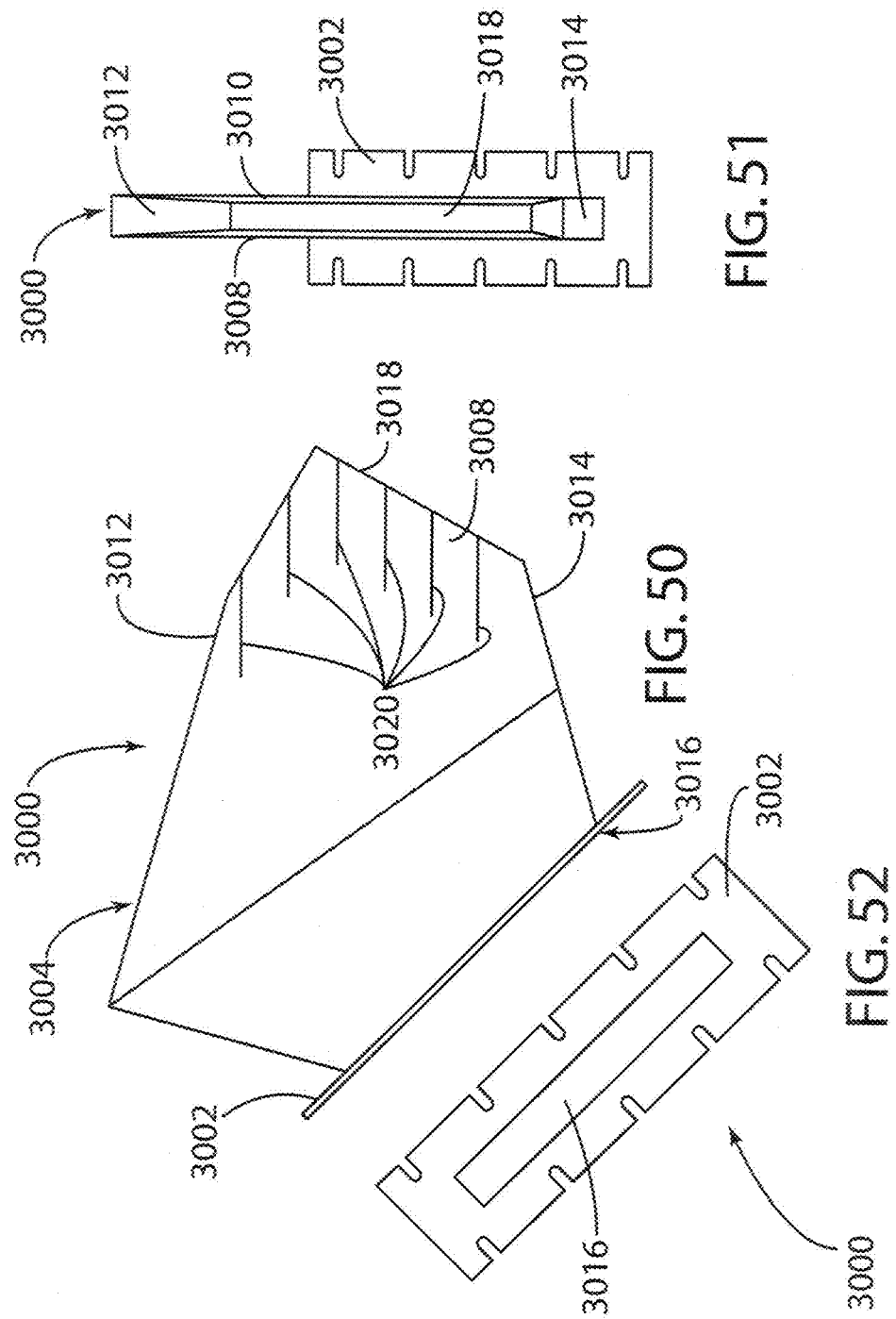

ed slots of the at least one rotating screen. The housing has a nozzle at the inlet such that the mass entering the path is a greater velocity than the mass entering the nozzle.

ROTARY FAN PRESS

CROSS-REFERENCE TO RELATED APPLICATION

This application claims priority to U.S. Provisional Patent Application No. 61/134,857 filed on Jul. 14, 2008 entitled IMPROVEMENTS TO ROTARY FAN PRESS, the entire contents of which are hereby incorporated herein by reference.

FIELD OF THE INVENTION

The present invention concerns a liquid extraction machine, and more particularly relates to liquid extraction machines having a rotary fan press.

BACKGROUND OF THE INVENTION

Apparatus for feeding, compressing, liquid extraction, washing and chemical treatment of sludge, slurries or other wet materials are well known. Such equipment finds particular application in the pulp and paper industry, waste water treatment, mineral processing, agriculture, food processing, fisheries, breweries, wineries, chemical processing, oil and tar sands industry, etc.

An improved apparatus is desired for feeding, compressing, liquid extracting, washing and chemical treating of the sludge, slurries or other wet materials.

SUMMARY OF THE PRESENT INVENTION

An aspect of the present invention is to provide a liquid extraction assembly for extracting liquid from a mass comprising a housing having an inlet and an outlet. The housing further includes a path between the inlet and the outlet. The housing is configured to have the mass forced into the inlet to move the mass from the inlet to the outlet. The housing includes at least one rotating screen adjacent the path, with each at least one rotating screen defining one wall of the path. The at least one rotating screen including a plurality of openings located at the path. Pressure from mass forced into the input presses the mass against the slots of the rotating screen to thereby force at least a portion of liquid in the mass to pass through the elongated slots of the at least one rotating screen. The housing has a nozzle at the inlet such that the mass entering the path is a greater velocity than the mass entering the nozzle.

Another aspect of the present invention is to provide a liquid extraction assembly for extracting liquid from a mass comprising a housing having an inlet and an outlet. The housing further includes a path between the inlet and the outlet. The housing is configured to have the mass forced into the inlet to move the mass from the inlet to the outlet. The housing includes at least one rotating screen adjacent the path, with each at least one rotating screen defining one wall of the path. The at least one rotating screen including a plurality of openings located at the path. Pressure from mass forced into the input presses the mass against the slots of the rotating screen to thereby force at least a portion of liquid in the mass to pass through the elongated slots of the at least one rotating screen. The housing includes an inflatable member providing a seal adjacent the at least one rotating screen for maintaining the mass in the path.

Yet another aspect of the present invention is to provide a liquid extraction assembly for extracting liquid from a mass comprising a housing having an inlet and an outlet. The housing further includes a path between the inlet and the outlet. The housing is configured to have the mass forced into the inlet to move the mass from the inlet to the outlet. The housing includes at least one rotating screen adjacent the path, with each at least one rotating screen defining one wall of the path. The at least one rotating screen including a plurality of openings located at the path. Pressure from mass forced into the input presses the mass against the slots of the rotating screen to thereby force at least a portion of liquid in the mass to pass through the elongated slots of the at least one rotating screen. The housing includes a center seal rotating with the at least one rotating screen and at least one fixed scraper in the path and adjacent the at least one rotating screen, with the at least one fixed scraper cleaning the at least one rotating screen as the rotating screen is rotated past the at least one fixed scraper. The center seal includes a notch for accepting a tip of the at least one fixed scraper therein.

A further aspect of the present invention is to provide a liquid extraction assembly for extracting liquid from a mass comprising a housing having an inlet and an outlet. The housing further includes a path between the inlet and the outlet. The housing is configured to have the mass forced into the inlet to move the mass from the inlet to the outlet. The housing includes at least one rotating screen adjacent the path, with each at least one rotating screen defining one wall of the path. The at least one rotating screen including a plurality of openings located at the path. Pressure from mass forced into the input presses the mass against the slots of the rotating screen to thereby force at least a portion of liquid in the mass to pass through the elongated slots of the at least one rotating screen. The inlet is located below the outlet. The housing includes a pair of side walls and an annular seal located between the pair of side walls, with the annular seal defining an outer periphery of the path. The annular seal has a rotating top end portion allowing an area of the outlet to change.

These and other aspects, objects, and features of the present invention will be understood and appreciated by those skilled in the art upon studying the following specification, claims, and appended drawings.

BRIEF DESCRIPTION OF DRAWINGS

FIG. 1 is a top view of a system for extracting liquid from a mass of the present invention.

FIG. 2 is a front view of the system for extracting liquid from a mass of the present invention.

FIG. 3 is a side view of the system for extracting liquid from a mass of the present invention.

FIG. 10 is a first side view of the inner housing shell of the housing of the liquid extraction assembly of the present invention.

FIG. 11 is a second side view of the inner housing shell of the housing of the liquid extraction assembly of the present invention.

FIG. 12 is a side view of a center seal of the liquid extraction assembly of the present invention.

FIG. 13 is a front view of the center seal of the liquid extraction assembly of the present invention.

FIG. 19 is an end view of an exit of the liquid extraction assembly of the present invention in a first position.

FIG. 19A is an end view of the exit of the liquid extraction assembly of the present invention in a second position.

FIG. 19B is a side cross-sectional view of the exit of the liquid extraction assembly of the present invention.

FIG. 19C is a side cross-sectional view of the exit of the liquid extraction assembly of a second embodiment of the present invention.

FIG. 22 is a partial front view of a third embodiment of the system for extracting liquid from a mass of the present invention.

FIG. 24 is a side view of a center seal of the third embodiment of the system for extracting liquid from a mass of the present invention.

FIG. 25 is a side view of an inner housing member of the liquid extraction assembly of the third embodiment of the system for extracting liquid from a mass of the present invention.

FIG. 26 is a partial rear view of the third embodiment of the system for extracting liquid from a mass of the present invention.

FIG. 32A is an enlarged view of an alternative to the fourth embodiment of the system for extracting liquid from a mass of the present invention showing a seal, a rotating screen assembly and a housing of the fourth embodiment of the system for extracting liquid from a mass.

FIG. 33A is a side view of the seal of the fourth embodiment of the system for extracting liquid from a mass of the present invention.

FIG. 33B is a cross-sectional view of the seal of the fourth embodiment of the system for extracting liquid from a mass of the present invention.

FIG. 34 is a partial front view of a fifth embodiment of the system for extracting liquid from a mass of the present invention.

FIG. 35 is an exploded view of a portion of the fifth embodiment of the system for extracting liquid from a mass of the present invention of FIG. 34.

FIG. 50 is a side view of the nozzle of the liquid extraction assembly of the sixth embodiment of the system for extracting liquid from a mass of the present invention.

FIG. 51 is an outlet view of the nozzle of the liquid extraction assembly of the sixth embodiment of the system for extracting liquid from a mass of the present invention.

FIG. 52 is an inlet view of the nozzle of the liquid extraction assembly of the sixth embodiment of the system for extracting liquid from a mass of the present invention.

DETAILED DESCRIPTION OF PREFERRED EMBODIMENTS

Figure 4:
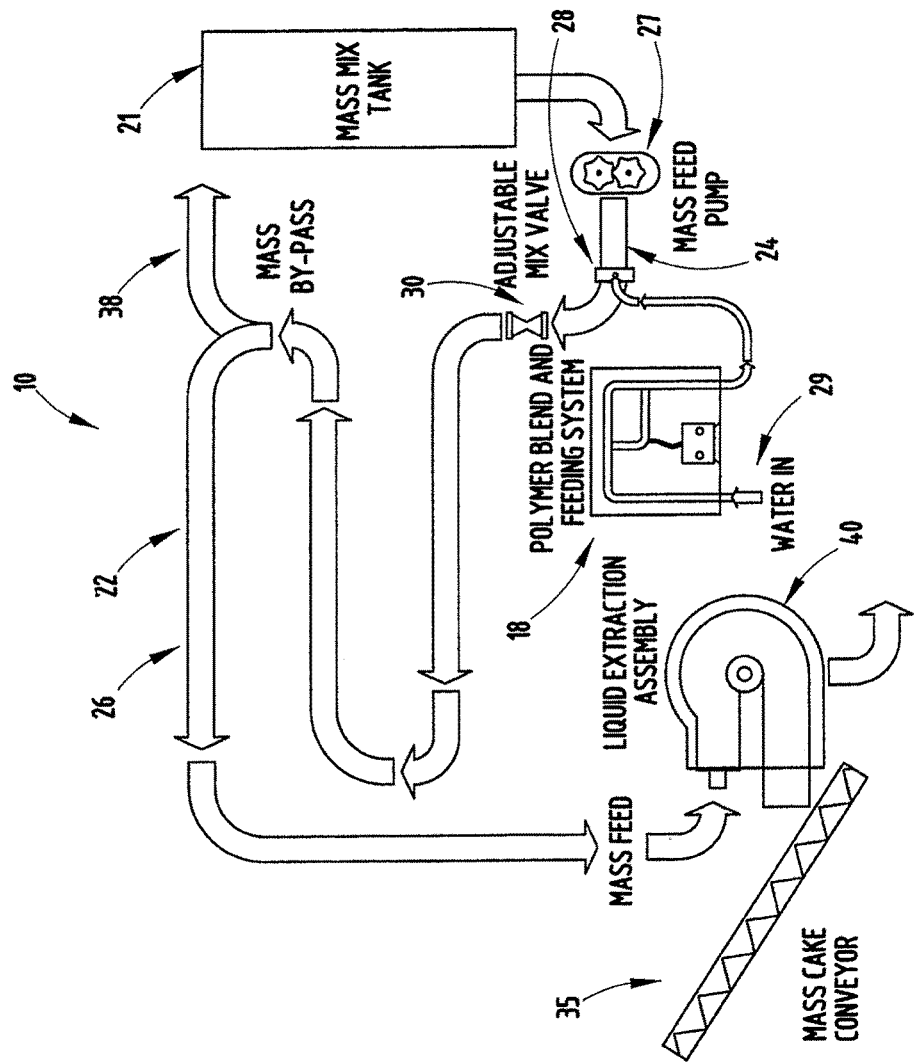
FIG. 4 is a schematic of the system for extracting liquid from a mass of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention relates to an apparatus and method for extracting liquid from a humid mass (e.g., sludges and slurries), as those used or produced in the pulp and paper industry, waste water treatment plants, agricultural, food and beverage industries, etc. The apparatus and method according to the present invention operate on the same basic extraction principle as the system and method described in U.S. Pat. No. 4,534,868, the disclosure of which is hereby incorporated herein by reference. The present invention is used to remove a portion of liquid from the humid mass to produce a waste solid that is easy to dispose.

The reference number 10 (FIGS. 1-4) generally designates a system for extracting liquid from a mass. The illustrated system 10 for extracting liquid from a mass comprises a platform 12 having an upper surface 14, a system mass input 16, a polymer feeding and blending system 18 on the upper surface 14, a liquid extraction assembly 40 on the upper surface 14, and piping 22 having a first section 24 between the system mass input 16 and the polymer feeding and blending system 18, and a second section 26 between the polymer feeding and blending system 18 and the liquid extraction assembly 40. The system 10 is configured to have mass inputted into the system mass input 16, transport the mass to the polymer feeding and blending system 18 through the first section 24 of the piping 22, inject polymer into the mass in the polymer feeding and blending system 18, and transport the mass from the polymer feeding and blending system 18 to the liquid extraction assembly 40. Pressure from mass forced into the liquid extraction assembly 40 forces liquid in the mass to exit the mass. In the illustrated embodiment, the liquid extraction assembly 40 comprises a pair of liquid extraction presses 11. However, it is contemplated that the liquid extraction assembly 40 of the present invention could use any number (including only one) of the liquid extraction presses 11 as described in more detail below.

In the illustrated embodiment, the system 10 can either include a source of mass (as shown schematically in FIG. 4) or be configured to be connected to a source of mass (as illustrated in FIG. 1). The mass is preferably a humid mass (e.g., sludges and slurries). As stated above, the mass can be that used or produced in the pulp and paper industry, waste water treatment plants, agricultural industries, food and beverages industries, etc. The system 10 of the present invention removes at least a portion of the liquid in the mass. In the illustrated embodiment, the system 10 is portable and can be directly brought to the pulp and paper industry, waste water treatment plants, agricultural industry, food and beverages industries, etc. for use at those locations. The system mass input 16 is configured to be connected to a hose that transports the mass to the system 10 from the source of mass. Preferably, the system 10 is located on the platform 12 that has an upper surface 14 smaller than 72 square feet to provide a compact and easily movable system. However, several of the inventive features disclosed herein can be used in a stationary and fixed system. In a stationary and fixed system, the source of mass can comprise a tank 21 (see FIG. 4) having the mass therein, with the tank 21 communicating with the system mass input 16.

The illustrated system 10 preferably includes a mass feed pump 27 for assisting in drawing the mass from the source of mass through the hose or from the tank 21. The mass feed pump 27 also provides pressure to the mass to assist in moving the mass through the piping 22 and into and through the liquid extraction assembly 40. Mass feed pumps 27 are well known to those skilled in the art. After passing through the mass feed pump 27, the mass is fed into the polymer feeding and blending system 18. The polymer feeding and blending system 18 is configured to be connected to a water supply 29 for mixing water with polymer in the polymer feeding and blending system 18. In the illustrated example, the system 10 includes a fitting 31 for connecting to a water supply for supplying the polymer feeding and blending system 18 with the water. The polymer feeding and blending system 18 includes an injection area 28 connected to the first section 24 and the second section 26 of the piping 22 and defines a transition from the first section 24 to the second section 26. After the water is mixed with the polymer, a combination of the water and polymer is injected into the injection area 28 for mixing with the mass from the first section 24 before the mass is moved to the second section 26 of the piping 22. The polymer feeding and blending system 18 and the polymer used therein are well known to those skilled in the art. The polymer is preferably a conventional known polymer flocculent, such as a polyacrylamide. However, it is contemplated that the system 10 could be used without an added polymer and without the polymer feeding and blending system 18. For example, a mass such as grinding swarf could be deliquidified using the system 10 without a polymer.

In the illustrated example, once the mass is moved to the second section 26 of the piping 22, the mass is thoroughly mixed with the combination of polymer and water in an adjustable mix valve 30 in the second section 26 of the piping 22. The second section 26 of piping 22 preferably includes a first portion 32 extending vertically upwards from the mix valve 30 to a top of the second section 26 of the piping 22. The second section 26 of the piping 22 also includes a second portion 34 comprising a plurality of horizontal rows 36 of pipes, with each row 36 connected at one end to the row 36 above and at another end at the row 36 below. The second portion 34 of the second section 26 of the piping 22 is connected to the liquid extraction assembly 40, wherein the mass is fed into the liquid extraction assembly 40. In the illustrated embodiment, the second section 26 of the piping 22 includes a mass bypass tube 38 having a selectively opening valve for allowing the mass in the second section 26 of the piping 22 to bypass the liquid extraction assembly 40. It is contemplated that the mass taken out of the second section 26 of the piping 22 could be reinserted into the system 10 by placing the mass taken out of the second section 26 into the source of mass or directly or indirectly into the system mass input 16. Likewise, the second section 26 of the piping 22 can include an extraction valve for each liquid extraction press 11 of the liquid extraction assembly 40 for selectively allowing the mass in the second section 26 to be fed into one or more of the liquid extraction presses 11. FIG. 4 illustrates a schematic representation of the system 10. As shown schematically in FIG. 4, the system 10 can include at least one conveyor 35 for accepting the solid portion of the mass exiting one or more of the liquid extraction assemblies 40 to move the mass to a disposal or collecting device (not shown).

In the illustrated example, the liquid extraction assembly 40 accepts the mass from the piping 22 and outputs a solid and the at least a portion of the liquid. The liquid extraction assembly 40 of the present invention includes a pair of liquid extraction presses 11 connected to a motor assembly 44. In the illustrated example, the system 10 of the present invention comprises a pair of liquid extraction presses 11 that share the motor assembly 44. However, it is contemplated that only one liquid extraction press 11 could be used or that each liquid extraction press 11 could have its own motor assembly 44. Furthermore, the system 10 can include any number of liquid extraction presses 11.

Figure 5:
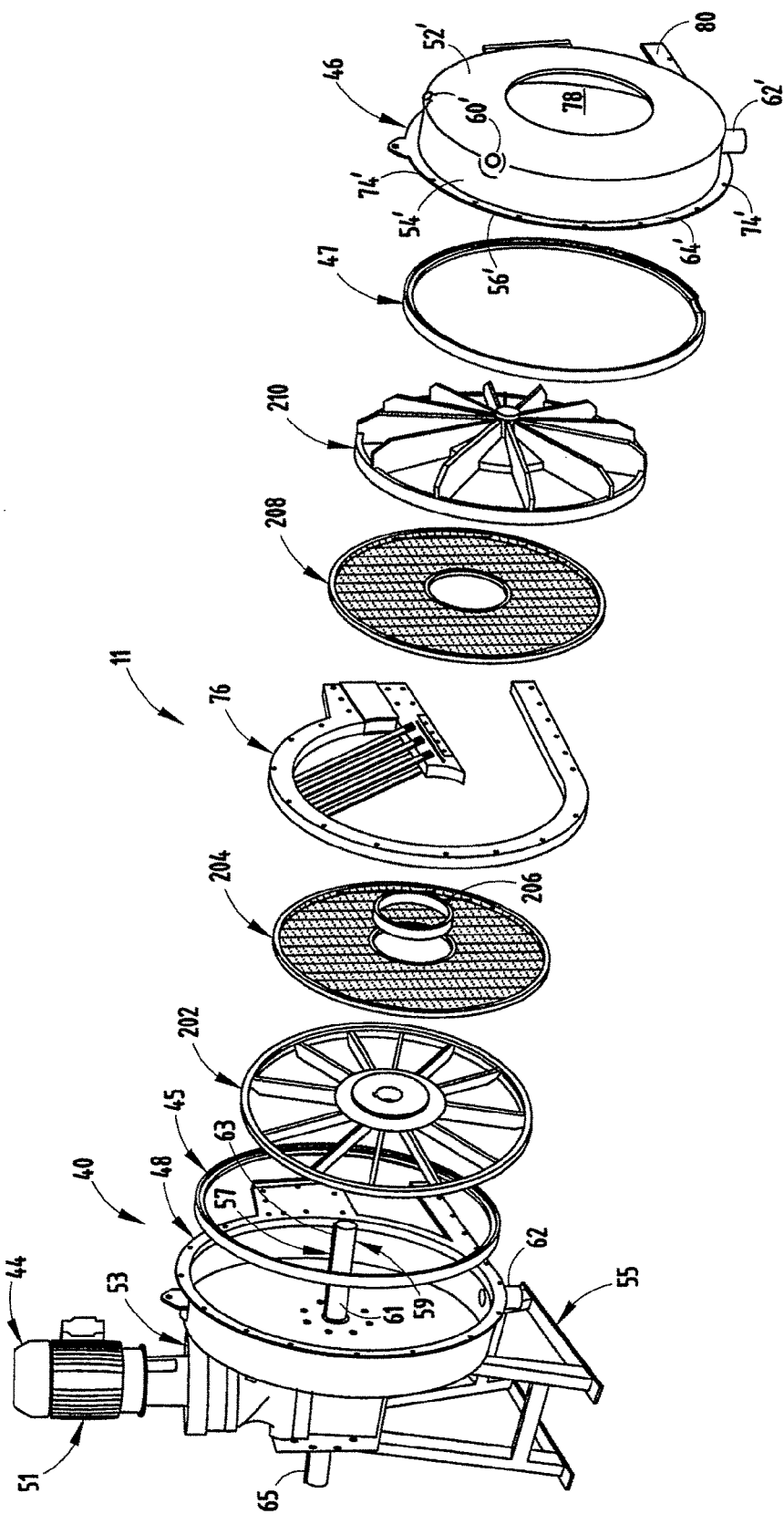
FIG. 5 is an exploded rear perspective view of a liquid extraction assembly and a motor assembly of the system of the present invention.

The illustrated motor assembly 44 powers the liquid extraction presses 11. The motor assembly 44 includes an upright motor 51, a transfer housing 53 and a support 55. The support 55 extends upwardly from the platform 12 between the liquid extraction presses 11. The upright motor 51 includes a vertical rotary output shaft (not shown) that extends into the transfer housing 53. The transfer housing 53 transmits the rotary motion of the vertical rotary output shaft of the upright motor 51 to a horizontal motor assembly output shaft 57 (see FIG. 6A) in a manner well known to those skilled in the art (e.g., a worm gear or any other means). The motor assembly output shaft 57 includes a first end 65 that extends into a first one of the liquid extraction presses 11 and a second end 59 that extends into a second one of the liquid extraction presses 11. As illustrated in FIGS. 5 and 6A, the first end 65 and the second end 59 of the motor assembly output shaft 57 each include a cylindrical portion 61 and a key flange 63 extending along a longitudinal surface of the cylindrical portion 61. The first end 65 and the second end 59 of the motor assembly output shaft 57 power the liquid extraction presses 11 as described in more detail below.

Figure 6:
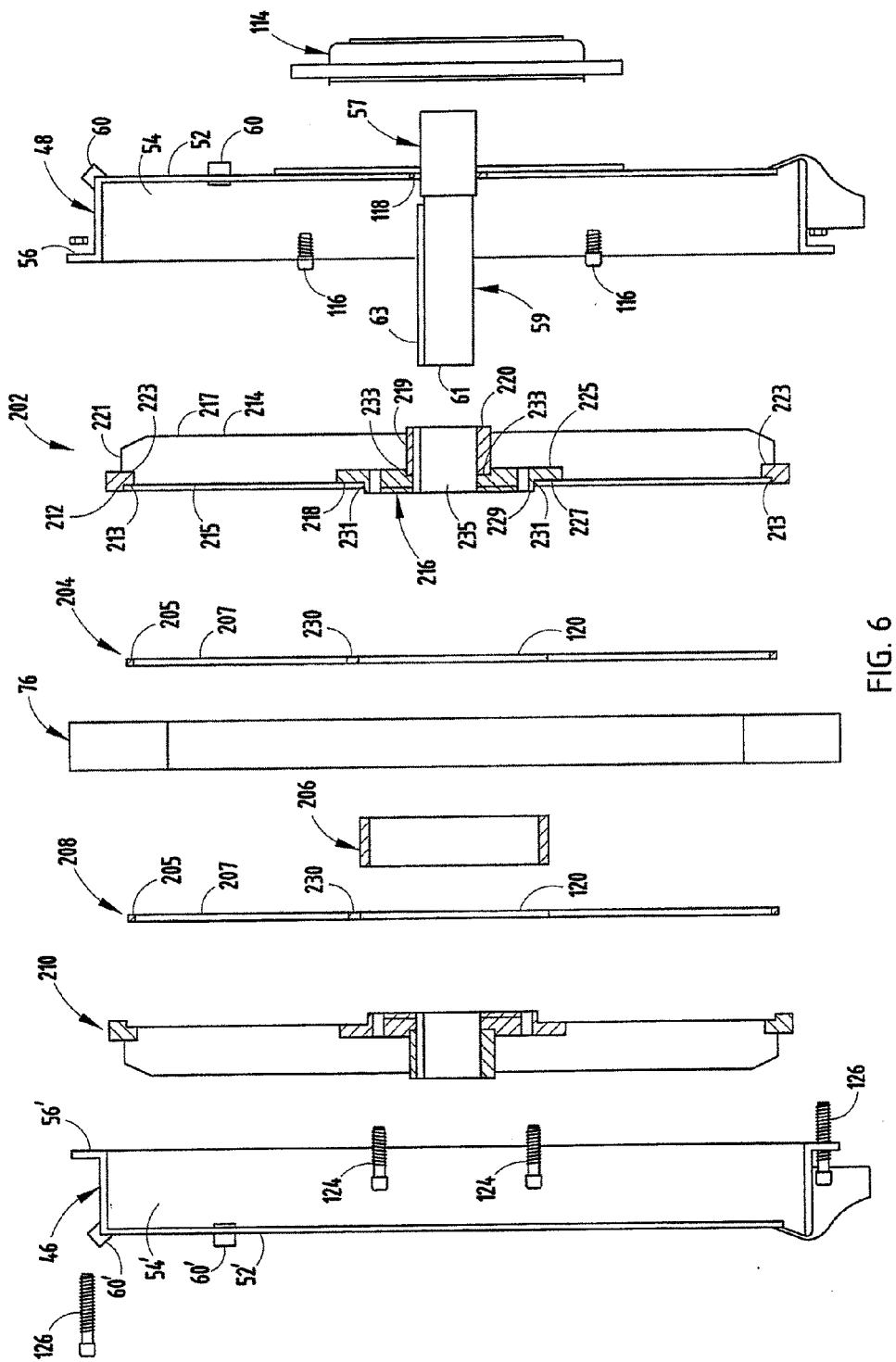
FIG. 6 is an exploded cross-sectional view of the liquid extraction assembly of the present invention.
Figure 6A:
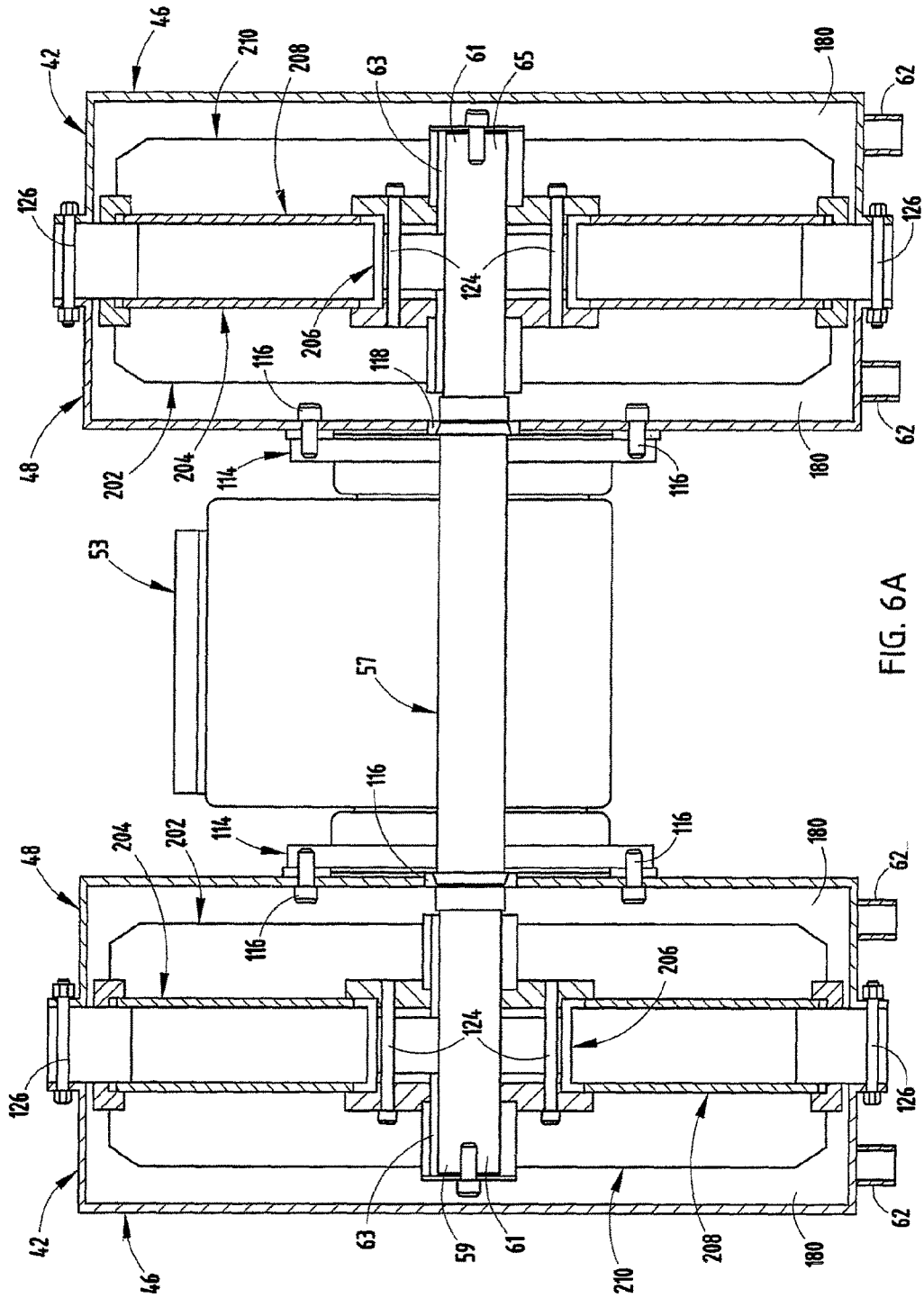
FIG. 6A is a cross-sectional view of a pair of liquid extraction assemblies and a transfer housing of a motor assembly of the system of the present invention.

As illustrated in FIGS. 5, 6 and 6A, each liquid extraction press 11 comprises a housing 42 including an outer housing shell 46 and an inner housing shell 48. The inner housing shell 48 (FIGS. 5, 6 and 8-11) includes a circular base wall 52, a tubular wall 54 extending from the base wall 52 and a peripheral flange 56 extending from the tubular wall 54 opposite the base wall 52. The circular base wall 52 includes a drive shaft opening 50 centrally located therein and a plurality of fastener openings 58 surrounding the drive shaft opening 50. The fastener openings 58 are configured to accept fasteners therein to connect the inner housing shell 48 to the motor assembly 44. The edge between the base wall 52 and the tubular wall 54 includes three sanitary holes 60 for allowing a cleaning fluid to be injected into the inner housing shell 48 when the liquid extraction assembly 40 is constructed to clean the liquid extraction assembly 40 as discussed below. Although three sanitary holes 60 are shown, any number of sanitary holes 60 could be employed. The sanitary holes 60 can be plugged during normal use of the liquid extraction assembly 40 or opened to allow water or other cleaning fluid to be injected into the liquid extraction assembly 40 to clean the liquid extraction assembly 40. It is contemplated that the sanitary holes 60 could have a threaded outer surface for connection to a common garden hose. The tubular wall 54 further includes a filtrate drain 62 located at a bottom of the tubular wall 54. The filtrate drain 62 allows the liquid extracted from the mass and any cleaning fluid injected into the liquid extraction assembly 40 to exit the liquid extraction assembly 40. The peripheral flange 56 of the inner housing shell 48 includes a circular portion 64, a bottom extending lip portion 66 and a nose portion 68. The bottom extending lip portion 66 and the nose portion 68 define an open mouth 70. As explained in more detail below, the open mouth 70 is configured to have a movable side wall 72 (see FIGS. 19 and 19A) inserted therein. The circular portion 64, the bottom extending lip portion 66 and the nose portion 68 all include a plurality of connection openings 74 for connecting a center seal 76 (described below) and the outer housing shell 46 to the inner housing shell 48. The inner housing shell 48 and the outer housing shell 46 are substantially a mirror image of each other (except that the outer housing shell 46 does not include the drive shaft opening 50, the mouth 70 and other details noted below).

In the illustrated example, the outer housing shell 46 includes a circular base wall 52', a tubular wall 54' extending from the base wall 52' and a peripheral flange 56' extending from the tubular wall 54' opposite the base wall 52'. The circular base wall 52' can include a window 78 centrally located therein for viewing an interior of the liquid extraction assembly 40. The edge between the base wall 52' and the tubular wall 54' includes three sanitary holes 60' for allowing a cleaning fluid to be injected into the inner housing shell 48 when the liquid extraction assembly 40 is constructed to clean the liquid extraction assembly 40 as discussed below. Although three sanitary holes 60' are shown, any number of sanitary holes 60' could be employed. The sanitary holes 60' can be plugged during normal use of the liquid extraction assembly 40 or opened to allow water or other cleaning fluid to be injected into the liquid extraction assembly 40 to clean the liquid extraction assembly 40. The tubular wall 54' further includes a filtrate drain 62' located at a bottom of the tubular wall 54'. The filtrate drain 62' allows the liquid extracted from the mass and any cleaning fluid injected into the liquid extraction assembly 40 to exit the liquid extraction assembly 40. The peripheral flange 56' of the inner housing shell 48' includes a circular portion 64' and an extension portion 80 extending from the circular portion 64'. The extension portion 80 has a peripheral shape substantially identical to the bottom extending lip portion 66, the nose portion 68 and the open mouth 70 of the inner housing shell 48. The circular portion 64' and the extension portion 80 include a plurality of connection openings 74' corresponding to the connection openings 74' of the inner housing shell 48 for connecting the center seal 76 (described below) and the inner housing shell 48 to the outer housing shell 46.

The illustrated center seal 76 (FIGS. 5, 6, 6A, 12 and 13) is positioned between the inner housing shell 48 and the outer housing shell 46 and defines an upper and lower boundary of the mass traveling through one of the liquid extraction presses 11 of the liquid extraction assembly 40. The center seal 76 also defines the inlet and the outlet for the sludge through the liquid extraction press 11. The center seal 76 includes an outer C-shaped portion 82, a scraper portion 84, a first inlet plate 86 and a second inlet plate 88. The outer C-shaped portion 82 includes an inlet extension 90 and an outlet extension 92. The inlet extension 90 includes a pair of grooves 94 configured to accept a top edge of the first inlet plate 86 and the second inlet plate 88. The outlet extension 92 of the outer C-shaped portion 82 includes an angled top surface 96. The scraper portion 84 is located between the outlet extension 92 and the inlet extension 90 of the outer C-shaped portion 82. The scraper portion 84 includes an inner annular face 98 having a scraping tip 100, a top face 102, a bottom face 104, a pair of side faces 106, and an end face 108 opposite to the inner annular face 98. A pair of upper grooves 110 in the pair of side faces 106 are configured to accept a bottom edge of the first inlet plate 86 and the second inlet plate 88. The bottom face 104 of the scraper portion 84 and the angled top surface 96 of the outlet extension 92 of the outer C-shaped portion 82 define a top and bottom surface for the outlet of the solid portion of the sludge that tapers outwardly. It is contemplated that at least one of the side wall 72 and the extension portion 80 could comprise a selectively actuatable constriction plate as discussed below. The outer C-shaped portion 82, the scraper portion 84, the first inlet plate 86 and the second inlet plate 88 each include connection openings 122 for connecting the center seal 76 to the inner housing shell 48 and the outer housing shell 46 as described below.

Figure 7:
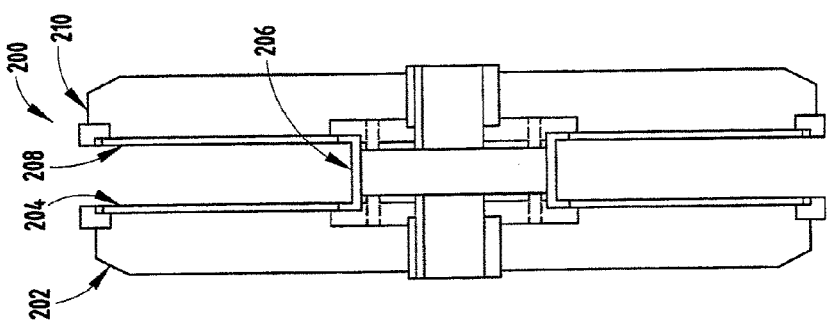
FIG. 7 is a cross-sectional view of a rotary screen assembly of the liquid extraction assembly of the present invention.
Figure 15:
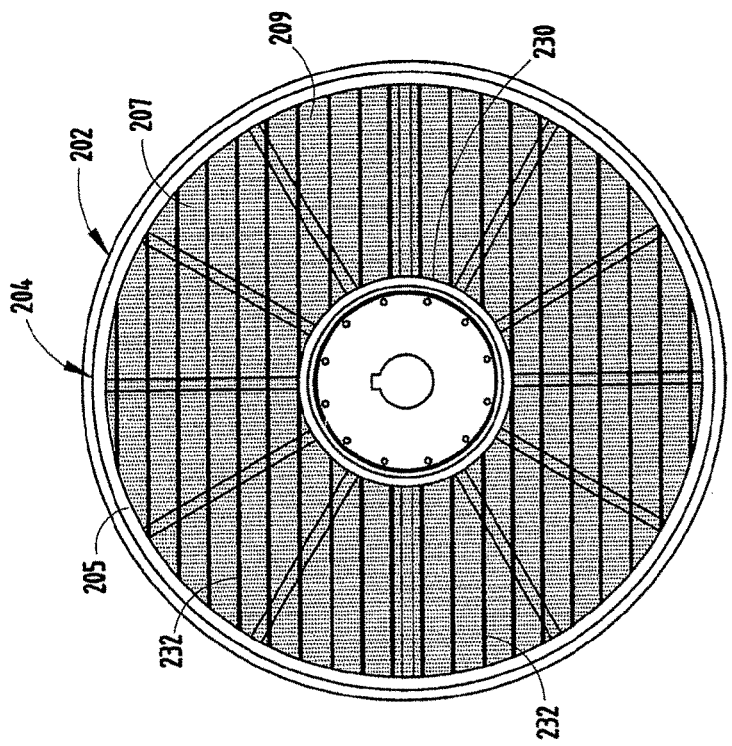
FIG. 15 is a second side view of a slotted filter screen and the drive wheel of the rotary screen assembly of the liquid extraction assembly of the present invention.

In the illustrated example, a rotary screen assembly 200 (FIG. 7) surrounds the center seal 76 and assists in removing the liquid portion from the sludge. The rotary screen assembly 200 includes a first side drive wheel 202, a first side slotted filter screen 204, a center hub/spacer 206, a second side slotted filter screen 208 and a second side drive wheel 210. The first side drive wheel 202 and the second side drive wheel 210 are preferably identical, but in an opposite orientation. Likewise, the first side slotted filter screen 204 and the second side slotted filter screen 208 are preferably identical, but in an opposite orientation.

The illustrated first side drive wheel 202 and the second side drive wheel 210 (FIGS. 5-7) each include an outer rim 212, a plurality of spokes 214 and an inner rim assembly 216. The outer rim 212 is substantially circular and includes an inner periphery notch 213. The plurality of spokes 214 each includes an inner edge 215, an outer edge 217, and inside end 219 and an outside end 221. An outer rim notch 223 is located at the intersection of the inner edge 215 and the outside end 221. The outer rim 212 is located in the outer rim notch 223. The spokes 214 also include an inner rim notch 225 located at the intersection of the inner edge 215 and the inside end 219. The inner rim assembly 216 comprises an inner annular plate 218 and a tubular drive shaft member 220. The inner annular plate 218 is located in the inner rim notch 225 of the spokes 214. The inner annular plate 218 includes a base portion 227 and a circular extension member 229 defining a center spacer/hub support notch 231 located outside of the circular extension member 229 and on a surface of the base portion 227 from which the circular extension member 229 extends. The base portion 227 of the inner annular plate 218 also includes a rear notch 233 having the tubular drive shaft member 220 therein. The inner annular plate 218 and the tubular drive shaft member 220 define a drive shaft opening 235 for accepting the first end 65 or the second end 59 of the motor assembly output shaft 57 therein. The key flange 63 of the first end 65 or the second end 59 of the motor assembly output shaft 57 is accepted into a drive shaft notch 237 of the drive shaft opening 235 to ensure that the tubular drive shaft member 220 and the inner annular plate 218 rotate with the motor assembly output shaft 57.

Figure 16:
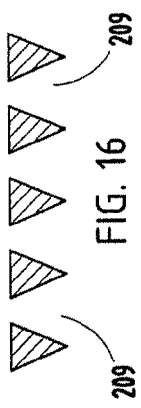
FIG. 16 is a cross-sectional view of the slotted filter screen of the present invention.
Figure 14:
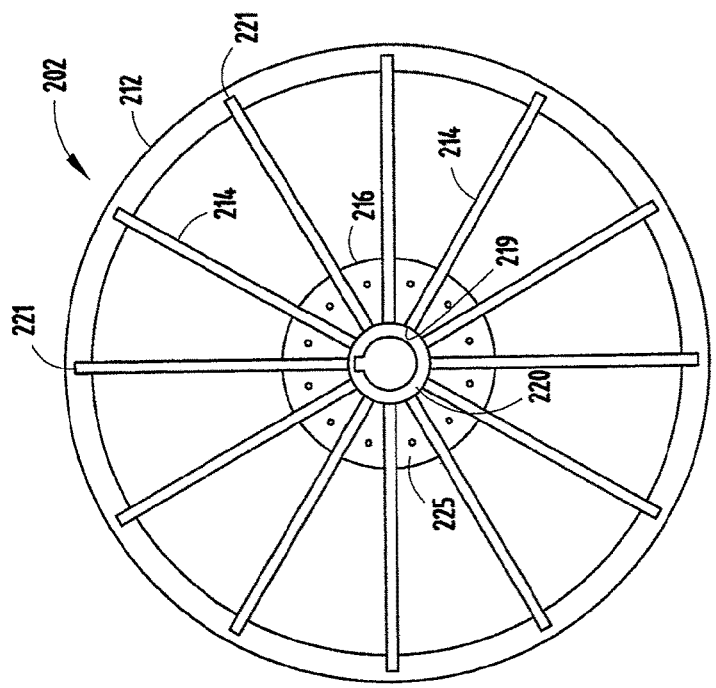
FIG. 14 is a first side view of a drive wheel of the rotary screen assembly of the liquid extraction assembly of the present invention.

In the illustrated example, the first side slotted filter screen 204 and the second side slotted filter screen 208 (FIGS. 5-6A, 15 and 16) each include an outer rim 205, a face 207 having a plurality of slots 209 and an inner hub 230. It is contemplated that the slotted filter screens could be made by connecting a plurality of wires to the outer rim 205 and the inner hub 230, thereby defining the slots 209. Alternatively, it is contemplated that the slotted filter screens 204 and 208 could be made by etching (for example, using water or another liquid) slots into an annular plate, thereby forming the outer rim 205, the face 207 having the plurality of slots 209 and the inner hub 230. The slotted filter screens 204 and 208 can also include a plurality of support bars 232 extending between the outer rim 205 and the inner hub 230 for supporting a rear side of the face 207 having the plurality of slots 209 therein. The slots 209 allow for a high filtration area over the slotted filter screens 204 and 208 compared to a perforated plate of the prior art, thereby providing a higher solid capture rate and easier cleaning. The spokes 214 of the first side drive wheel 202 and the second side drive wheel 210 abut against the support bars 232 of the slotted filter screens 204 and 208. It is contemplated that the slotted filter screens 204 and 208 could have any diameter, including 24 and 36 inches. The slots 209 preferably extend from a first point on the circumference of the slotted filter screens 204, 208 to a second point on the circumference of the slotted filter screens 204, 208 (with a possible interruption if the slots cross the center of the slotted filter screens 204, 208). As illustrated in FIG. 16, the slots 209 preferably have a triangular shape, with the larger end of the slots 209 abutting against the mass as the mass moves through the liquid extraction assembly 40.

Figure 9:
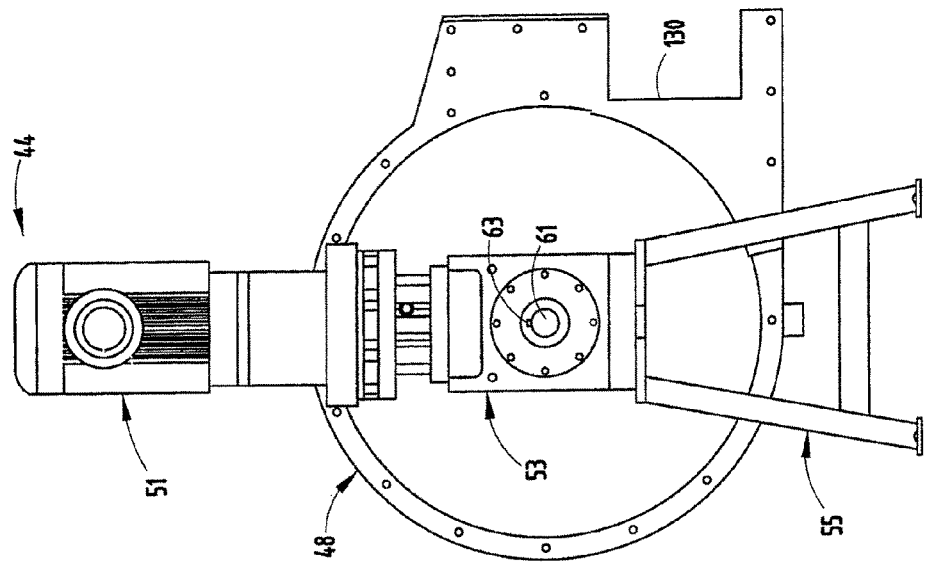
FIG. 9 is side view of the inner housing shell of the liquid extraction assembly and the motor assembly of the liquid extraction system of the present invention.
Figure 8:
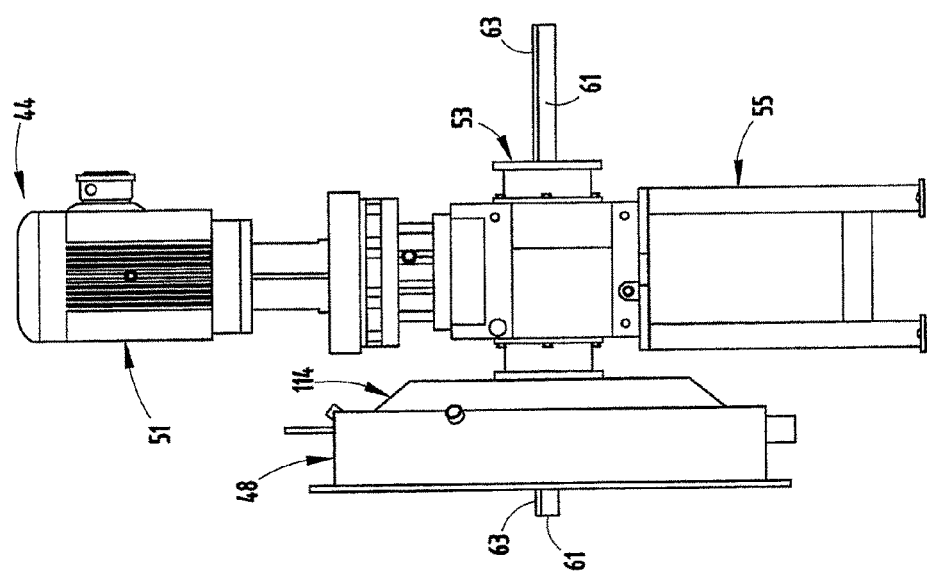
FIG. 8 is a rear view of an inner housing shell of the liquid extraction assembly and the motor assembly of the liquid extraction system of the present invention.

The illustrated liquid extraction assembly 40 is assembled by connecting the liquid extraction presses 11 to the motor assembly 44. In the discussion below, only the connection of one liquid extraction press 11 to the motor assembly 44 will be described. However, any remaining liquid extraction presses 11 can be connected to the motor assembly 44 in a similar manner. In connecting the liquid extraction press 11 to the motor assembly 44, the first step is to connect the inner housing shell 48 to the motor assembly 44 as illustrated in FIGS. 8 and 9. The inner housing shell 48 is connected to the motor assembly 44 by first placing an annular cap 114 (see FIGS. 6 and 6A) over the second end 59 of the motor assembly output shaft 57 and connecting the annular cap 114 to the transfer housing 53 of the motor assembly 44. The second end 59 of the motor assembly output shaft 57 is then inserted through the drive shaft opening 50 of the inner housing shell 48. The inner housing shell 48 is then connected to the motor assembly 44 by inserting fasteners 116 through the fastener openings 58 in the base wall 52 of the inner housing shell 48 and into the annular cap 114 (which is connected to the transfer housing 53). As illustrated in FIGS. 6 and 6A, a seal 118 is located between the motor assembly output shaft 57 and the drive shaft opening 50 of the inner housing shell 48.

After the inner housing shell 48 has been connected to the motor assembly 44, the first side drive wheel 202 of the rotary screen assembly 200 is slid onto the second end 59 of the motor assembly output shaft 57. The first side drive wheel 202 is slid onto the motor assembly output shaft 57 by inserting the second end 59 of the motor assembly output shaft 57 into the drive shaft opening 235 of the inner annular plate 218 and the tubular drive shaft member 220 of the first side drive wheel 202, with the key flange 63 of the second end 59 of the motor assembly output shaft 57 being inserted into the drive shaft notch 237 of the drive shaft opening 235 as discussed above. Thereafter, the center hub/spacer 206 is placed around circular extension member 229 of the inner rim assembly 216 of the first side drive wheel 202. The first side slotted filter screen 204 is then placed over the center hub/spacer 206 by inserting the center hub/spacer 206 within an opening 120 defined by the inner hub 230 of the first side slotted filter screen 204. Once the first side slotted filter screen 204 is fully slid over the center hub/spacer 206, the first side slotted filter screen 204 will abut against the inner edges 215 of the spokes 214 of the first side drive wheel 202 and be located between the inner periphery notch 213 of the first side drive wheel 202 and the center hub/spacer 206. When the first side drive wheel 202 and the first side slotted filter screen 204 are fully connected to the motor assembly output shaft 57 as described directly above, the first side drive wheel 202 and the first side slotted filter screen 204 will be located within the inner housing shell 48.

Figure 18:
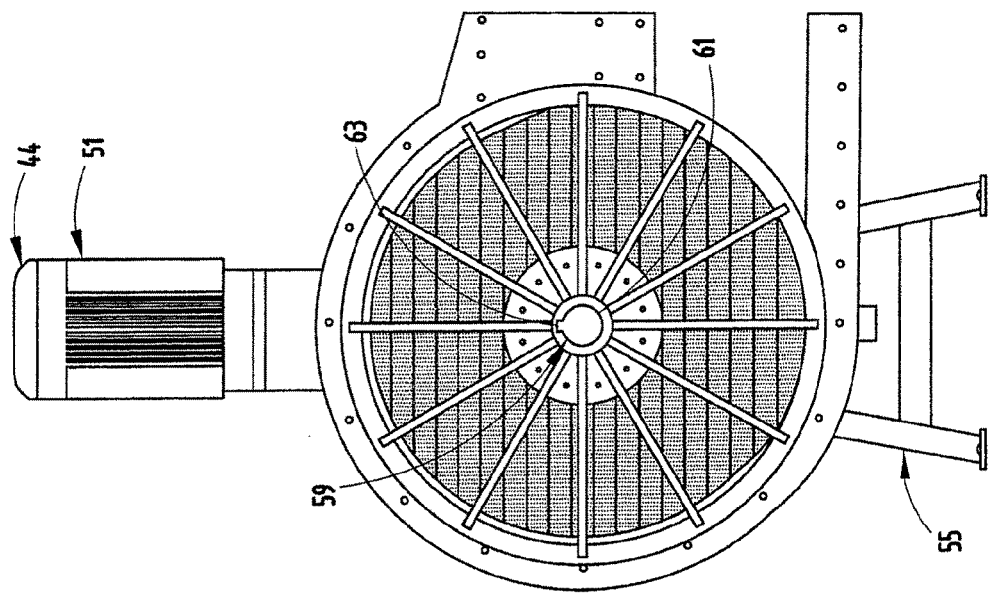
FIG. 18 is a side view of the motor assembly, the inner housing shell, the rotary screen assembly, the drive shaft, and the center seal of the liquid extraction assembly of the present invention.
Figure 17:
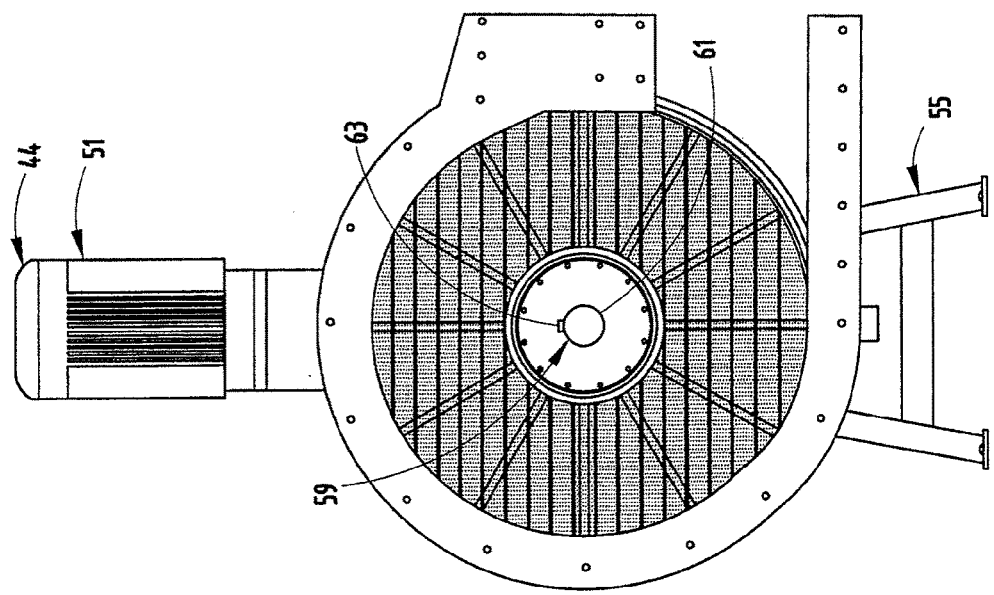
FIG. 17 is a side view of the motor assembly, the inner housing shell, the slotted filter screen, the drive wheel, the drive shaft and the center seal of the liquid extraction assembly of the present invention.

After the first side drive wheel 202, the first side slotted filter screen 204 and the center hub/spacer 206 are assembled as described directly above, the center seal 76 is positioned against the peripheral flange 56 of the inner housing shell 48 as shown in FIG. 17. The center seal 76 is positioned such that the connection openings 122 of the center seal 76 are aligned with the connection openings 74 of the inner housing shell 48. Furthermore, the outside surface of the center hub/spacer 206 will abut the inner annular face 98 of the scraper portion 84 of the center seal 76 as illustrated in FIG. 12. Thereafter, the second side slotted filter screen 208 is slid onto the center hub/spacer 206 by inserting the center hub/spacer 206 within an opening 120 defined by the inner hub 230 of the second side slotted filter screen 208. The second side filter screen 208 is then connected to the liquid extraction press 11 by inserting the second end 59 of the motor assembly output shaft 57 through the drive shaft opening 235 of the inner annular plate 218 and the tubular drive shaft member 220 of the second side drive wheel 210, with the key flange 63 of the second end 59 of the motor assembly output shaft 57 being inserted into the drive shaft notch 237 of the drive shaft opening 235 as discussed above. Furthermore, the circular extension member 229 is inserted into the center hub/spacer 206 and the second side slotted filter screen 208 will abut against the inner edges 215 of the spokes 214 of the second side drive wheel 210 and be located between the inner periphery notch 213 of the second side drive wheel 210 and the center hub/spacer 206. Additionally, a plurality of fasteners 124 are inserted through openings in the inner rim assemblies 216 of the first side drive wheel 202 and the second side drive wheel 210 as illustrated in FIGS. 6 and 6A to assembly the rotary screen assembly 200. The assembly of the liquid extraction press 11 up to this point is illustrated in FIG. 18. Finally, the outer housing shell 46 is abutted against the center seal 76 and the connection openings 74' of the outer housing shell 46 are aligned with the connection openings 122 in the center seal 76 and the connection openings 74 in the inner housing shell 48, and fasteners 126 are inserted through the connection openings 74, 74' and 122 to connect the inner housing shell 48, the center seal 76 and the outer housing shell 46. While a particular assembly procedure has been outlined above, it is contemplated that the liquid extraction assembly 40 could be assembled in any manner. For example, the rotary screen assembly 200 can be assembled as a unitary piece before being connected to the housing 42 of the liquid extraction assembly 40. Furthermore, it is contemplated that the liquid extraction assembly 40 could include a T-shaped seal 45 located between the outer housing shell 46 and the second side drive wheel 210 and between the inner housing shell 48 and the first side drive wheel 202 as illustrated in FIGS. 5-6A, with the T-shaped seals 45 being wedged between the center seal 76, the tubular wall 54, the first side drive wheel 202 and a stop 49 extending from the tubular wall 54 on one side and between the center seal 76, the tubular wall 54', the second side drive wheel 210 and a stop 49 extending from the tubular wall 54 on the other side.

Once the liquid extraction press 11 is assembled as described above, the mass will have a path through the liquid extraction press 11 defined by the center seal 76, the first side slotted filter screen 204, the second side slotted filter screen 208, the center spacer/hub 206, the extension 80 of the outer housing shell 46 and the side wall 72. As shown in FIGS. 19 and 19A, the side wall 72 is located within the open mouth 70 defined by the bottom extending lip portion 66 and the nose portion 68 of the inner housing shell 48. The side wall 72 is hinged at 134 to a rear portion 130 of the open mouth 70 (see FIGS. 1 and 9-11). The side wall 72 has an air bellows 132 connected to an outer face thereof to rotate the side wall 72 about the hinge 134. In a fully closed position as shown in FIG. 19, the side wall 72 is substantially parallel to the extension 80 of the outer housing shell 46. However, the air bellows 132 can be activated to rotate the side wall 72 about the hinge 134 to widen the exit of the liquid extraction press 11 as shown in FIG. 19A. Therefore, the mass enters into the liquid extraction press 11 through a liquid extraction assembly inlet defined by the inlet extension 90, the first inlet plate 86, the second inlet plate 88 and the top face 102 of the scraper portion 84 of the center seal 76. The mass then moves towards a rear of the center seal 76 and around the center hub/spacer 206 in a path defined by the inner surface of the outer C-shaped portion 82 of the center seal 76, first side slotted filter screen 204, the second side slotted filter screen 208 and the center spacer/hub 206. Finally, the mass exits the liquid extraction assembly through a liquid extraction assembly exit defined by the bottom face 104 of the scraper portion 84 of the center seal 76, the angled top surface 96 of the outlet extension 92, the extension 80 of the outer housing shell 46 and the side wall 72.

In use, the mass enters the liquid extraction assembly 40 through the inlet and is forced around the center hub/spacer 206. While the center seal 76 and the housing 42 are fixed in position, the rotary screen assembly 200 will rotate with the motor assembly output shaft 57 as described above. The pressure of the mass in the piping 22 will force the sludge through the liquid extraction assembly 40 towards the outlet of the liquid extraction assembly. However, as the sludge is moving through liquid extraction assembly 40, the slotted filter screens 204, 208 on either side of the mass will remove the liquid portion from the sludge as described in U.S. Pat. No. 4,534,868. As the slotted filter screens 204, 208 remove the liquid portion from the sludge, the liquid falls down through a pair of areas 180 (see FIG. 6A) between the rotary screen assembly 200 and each of the inner housing shell 48 and the outer housing shell 46. The liquid then exits the housing 42 through the filtrate drains 62. Furthermore, as illustrated in FIG. 2, the filtrate drains 62 can be connected to a liquid exit tube 190 adapted to be connected to a further liquid exit element for disposing of the liquid. Therefore, the liquid portion will flow through the slotted filter screens 204, 208 and down through the filtrate drains 62, 62' of the outer housing shell 46 and the inner housing shell 48, respectively. As the mass moves in the circular path within the liquid extraction assembly 40, the scraping tip 100 of the scraping portion 84 of the center seal 76 will scrape the mass off of the center hub/spacer 206 and move the mass to the outlet of the liquid extraction assembly 40. As the mass moves towards the outlet of the liquid extraction assembly 40, the mass will mostly (if not almost all or all) comprise the solid portion of the sludge to form the cake. Since the mass cake discharge zone tapered outward as described above, rather than straight, the sludge cake can be better controlled and bridging and/or binding of the sludge cake will be reduced.

In the illustrated example, the liquid extraction assembly 40 includes several features for cleaning the interior of the liquid extraction presses 11, the first side slotted filter screen 204 and the second side slotted filter screen 208. First, the scraper portion 84 of the center seal 76 includes a plurality of inlet scrapers 140 (see FIG. 12) extending upward from the side faces 106 of the scraper portion 84. The inlet scrapers 140 abut against the inside faces of the first side slotted filter screen 204 and the second side slotted filter screen 208 as the first side slotted filter screen 204 and the second side slotted filter screen 208 rotate past the inlet scrapers 140, thereby scraping the inside faces of the first side slotted filter screen 204 and the second side slotted filter screen 208 as they rotate past the inlet scrapers 140. Second, the scraper portion 84 of the center seal 76 includes a plurality of cake scrapers 142 (see FIG. 12) extending outward from the side faces 106 of the scraper portion 84. The cake scrapers 142 abut against the inside faces of the first side slotted filter screen 204 and the second side slotted filter screen 208 as the first side slotted filter screen 204 and the second side slotted filter screen 208 rotate past the inlet scrapers 140, thereby scraping the inside faces of the first side slotted filter screen 204 and the second side slotted filter screen 208 as they rotate past the scraper portion 84 of the center seal 76. Third, the scraper portion 84 of the center seal 76 includes a pair of wash nozzles 144 in the side faces 106 of the scraper portion 84. The scraper portion 84 includes a bore 146 through the scraper portion 84, with a washer fluid inlet 148 in the end face 108 of the scraper portion 84 (see FIG. 13). As illustrated in FIGS. 2 and 3, water entering the water supply 29 can also be directed to the washer fluid inlet 148 in the scraper portion 84 and then into the bore 146. The water is then ejected out of the bore 146 through the wash nozzles 144 in the side faces 106 of the scraper portion 84, thereby cleaning the first side slotted filter screen 204 and the second side slotted filter screen 208 as they rotate past the scraper portion 84. It is therefore contemplated that the nozzles 144 can wash and clean the first side slotted filter screen 204 and the second side slotted filter screen 208 during use of the system 10 (i.e., while the mass is deliquefied). Finally, the entire liquid extraction assembly can be cleaned by injecting water or a cleaning fluid into the inner housing shell 48 and the outer housing shell 46 through the sanitary holes 60', 60, respectively, as described above.

Figure 19E:
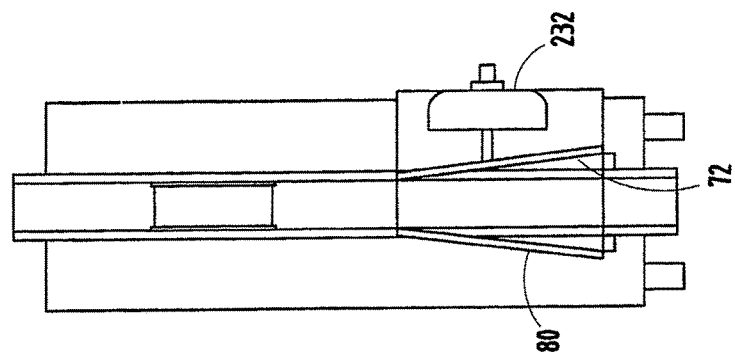
FIG. 19E is an end view of the exit of a fourth embodiment of the liquid extraction assembly of the present invention.
Figure 19D:
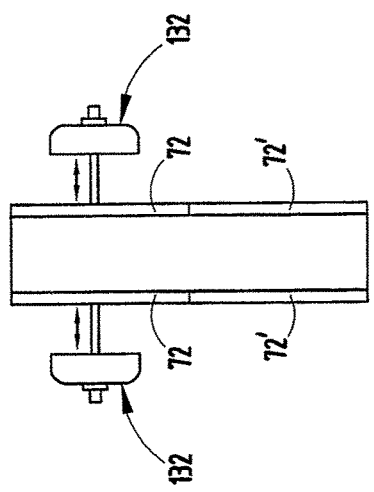
FIG. 19D is an end view of the exit of a third embodiment of the liquid extraction assembly of the present invention.

In the illustrated embodiment, the outlet of the liquid extraction presses 11 includes a top wall defined by the bottom face 104 of the scraper portion 84 of the center seal 76, a bottom wall defined by the angled top surface 96 of the outlet extension 92 of the center seal, a first side wall defined by the extension 80 of the outer housing shell 46 and a second side wall defined by the side wall 72. In the illustrated example, the outlet tapers outwardly because the top wall of the outlet is horizontal and the bottom wall tapers outwardly as described above such that the mass passes from a smaller area to a larger area as the mass passes through the outlet (see FIG. 19B). Furthermore, the side walls can either be parallel or have the side wall 72 taper outwardly as described above. Such an arrangement is illustrated in FIG. 19B. However, it is contemplated that the top wall, the bottom wall, the first side wall and/or the second side wall of the outlet can taper outwardly. For example, as illustrated in FIG. 19C, the bottom face 104 of the scraper portion 84 of the center seal 76 can taper outwardly, thereby providing the outlet with a top and bottom outwardly tapering wall. Furthermore, it is contemplated that the bottom wall of the outlet could be horizontal and the top wall could taper outwardly by having the bottom face 104 of the scraper portion 84 of the center seal 76 taper outwardly. Moreover, it is contemplated that both side walls of the outlet can have the side wall 72 as discussed above (with the outer housing shell 46 including the open mouth 70 and a second side wall 72 therein) such that both of the side walls of the outlet can be selectively moved to taper outwardly. Additionally, it is contemplated that the side wall 72 could only comprise a portion of the side wall of the outlet, with a stationary side wall 72' being located under or over the movable side wall 72 as illustrated in FIG. 19D. Furthermore, it is contemplated that both the side walls of the outlet could taper outwards in a direction from the top wall of the outlet to the bottom wall of the outlet as shown in FIG. 19E such that the distance between the side walls of the outlet is smaller at the top than the bottom of the side walls.

Figure 20:
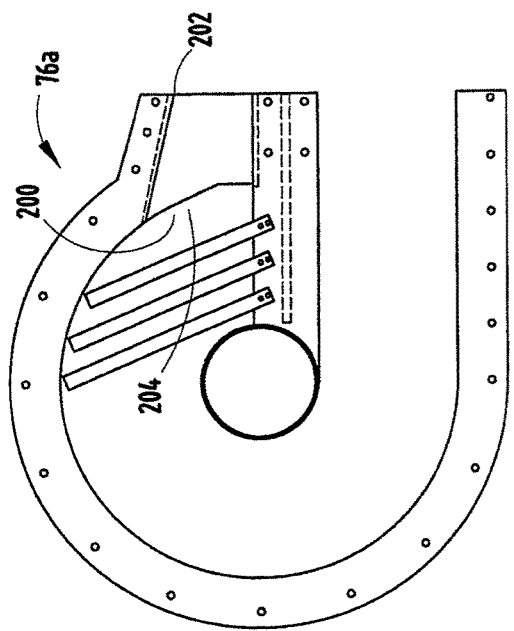
FIG. 20 is a side view of a second embodiment of the center seal of the present invention.
Figure 23:
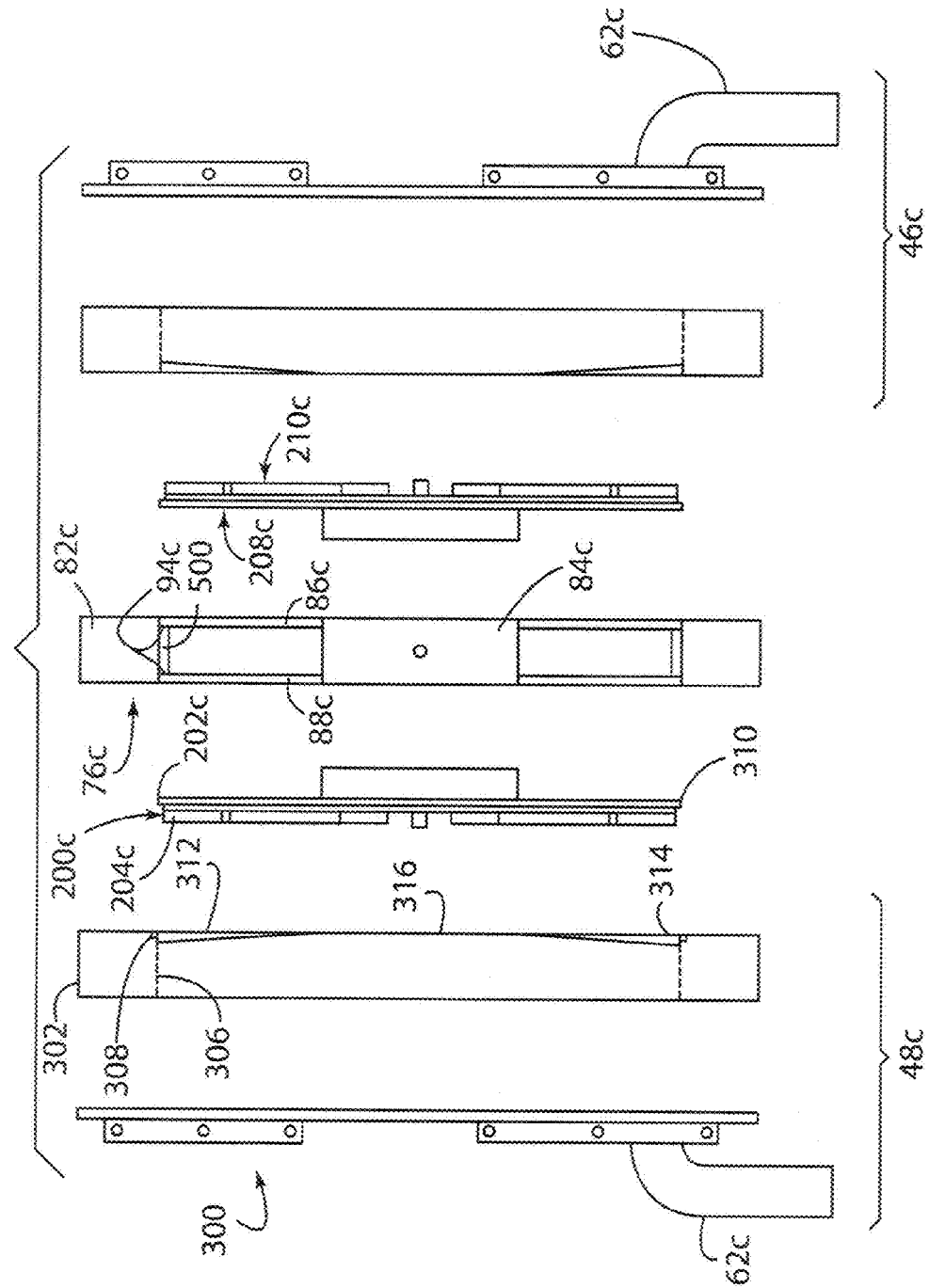
FIG. 23 is a partial exploded front view of a liquid extraction assembly of the third embodiment of the system for extracting liquid from a mass of the present invention.
Figure 27:
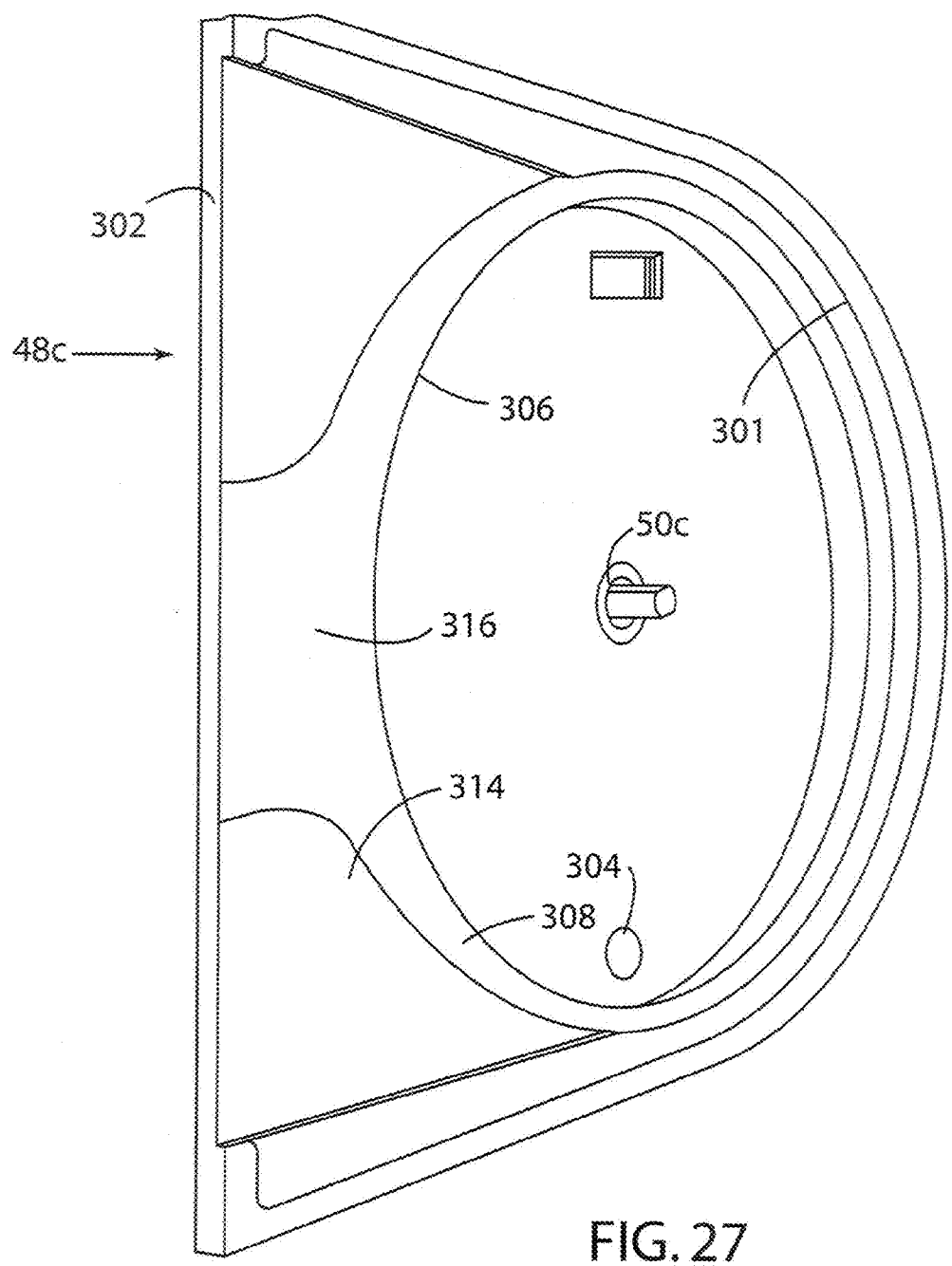
FIG. 27 is a side view of an inner housing member of the liquid extraction assembly of the third embodiment of the system for extracting liquid from a mass of the present invention.
Figure 28:
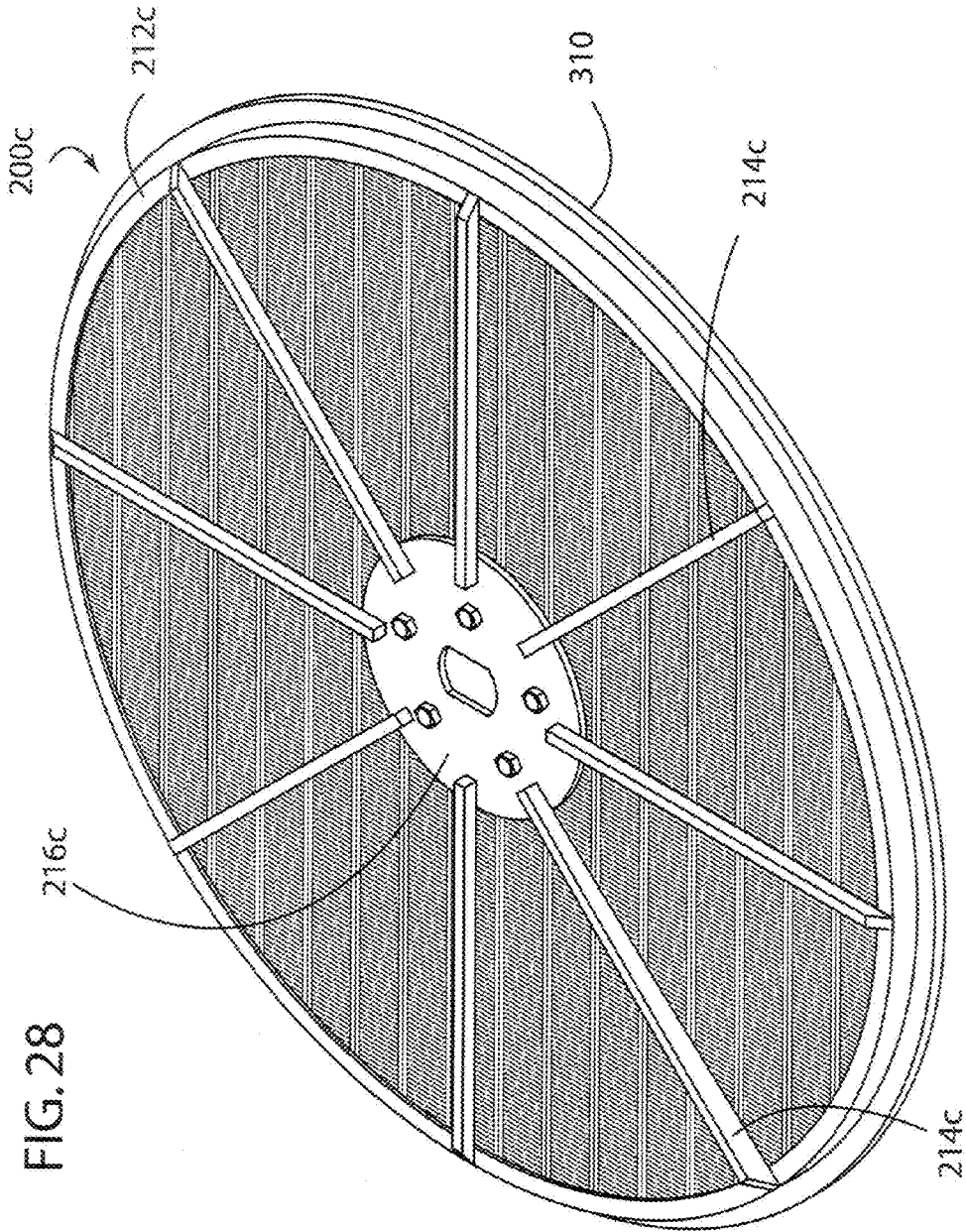
FIG. 28 is perspective view of an outside view of a rotating screen assembly of the third embodiment of the system for extracting liquid from a mass of the present invention.
Figure 29:
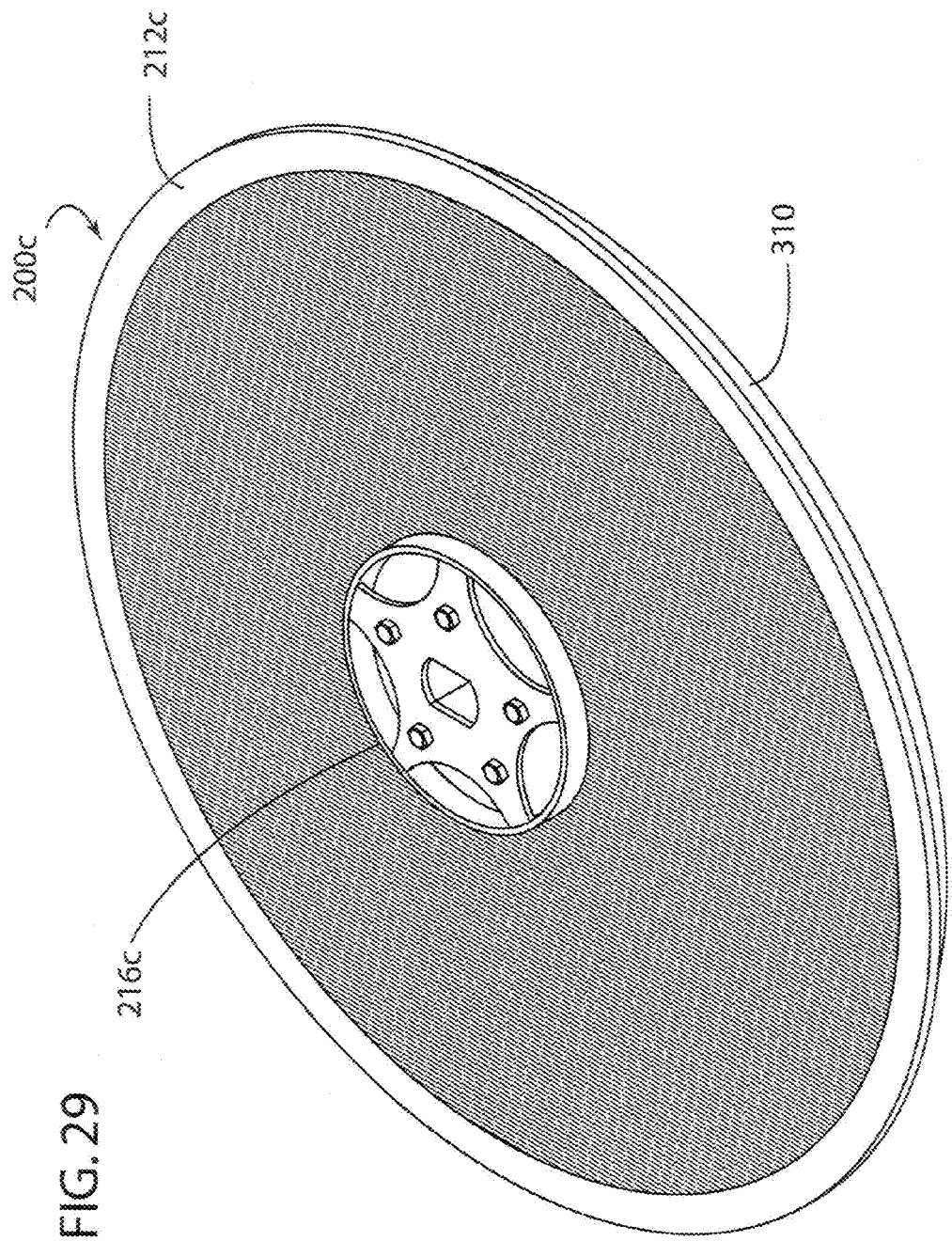
FIG. 29 is a perspective view of an inside view of a rotating screen assembly of the third embodiment of the system for extracting liquid from a mass of the present invention.

The reference numeral 76a (FIG. 20) generally designates another embodiment of the present invention, having a second embodiment for the center seal. Since center seal 76a is similar to the previously described center seal 76, similar parts appearing in FIGS. 12-13 and FIG. 20, respectively, are represented by the same, corresponding reference number, except for the suffix "a" in the numerals of the latter. The center seal 76a includes an inwardly tapering inlet. The inlet of the housing 18a and the center seal 76a tapers outwardly towards a rear 200 of the inlet such that a beginning 202 of the inlet is smaller than an end 204 of the inlet. A top of the first inlet plate 86a, the second inlet plate 88a, and the pair of grooves 94a of the inlet extension 90a will also taper outwardly towards the end 204 of the inlet. Therefore, in the second embodiment of the center seal 76a, the pressure of the mass entering the housing 18a will decrease as the mass enters the inlet. The remainder of the center seal 76a and the housing 18a can be identical to any of the center seals and housings described above.

Figure 21:
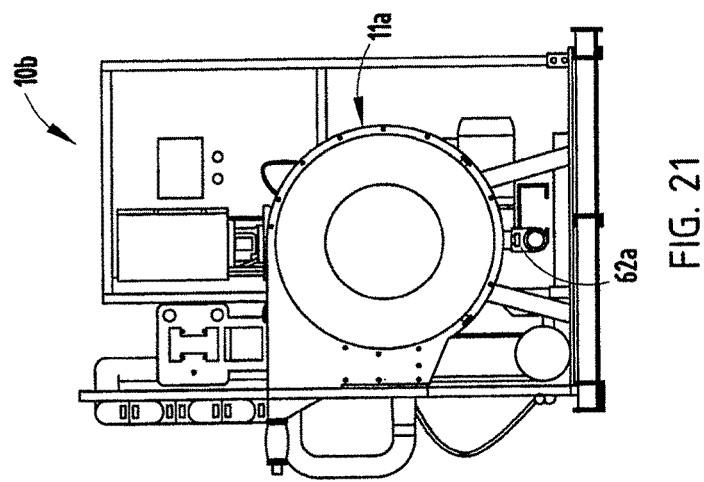
FIG. 21 is a side view of a second embodiment of the system for extracting liquid from a mass of the present invention.

The reference numeral 10b (FIG. 21) generally designates another embodiment of the present invention, having a second embodiment for the system for extracting liquid from a mass. Since the system 10b is similar to the previously described system 10, similar parts appearing in FIGS. 1-19 and FIG. 21, respectively, are represented by the same, corresponding reference number, except for the suffix "b" in the numerals of the latter. In the second embodiment of the system 10b, the liquid extraction presses 11b and everything therein is orientated upside-down, such that the inlet to the liquid extraction press 11b is located below the outlet of the liquid extraction press 11b and the mass will move upwardly through the liquid extraction press 11b. However, the filtrate drain 62b will continue to be located at a bottom of the liquid extraction presses 11b, such that liquid will continue to be able to be drained out of the liquid extraction presses 11b. Furthermore, the sanitary holes 60b would continue to be located at a top of the liquid extraction presses 11b.

The reference number 10c (FIGS. 22-29) generally designates another embodiment of the present invention, having a third embodiment for the system for extracting liquid from a mass. Since the system 10c is similar to the previously described system 10, similar parts appearing in FIGS. 1-19 and FIGS. 22-29, respectively, are represented by the same, corresponding reference number, except for the suffix "c" in the numerals of the latter. In the third embodiment of the system 10c, the liquid extraction presses 11c and everything therein is orientated upside-down (as in the second embodiment of the system 10b), such that the inlet to the liquid extraction press 11c is located below the outlet of the liquid extraction press 11c and the mass will move upwardly through the liquid extraction press 11c. However, the filtrate drain 62c will continue to be located at a bottom of the liquid extraction presses 11c, such that liquid will continue to be able to be drained out of the liquid extraction presses 11b. Furthermore, the liquid extraction press 11c will have a slightly different configuration as discussed below (although the liquid extraction press 11c will continue to function the same as the liquid extraction press 11b). It is noted that FIG. 22 is a partial drawing of the system 10c only showing the liquid extraction assembly 40c and the motor assembly 44c, with the remaining elements (the platform, the system mass input, the polymer feeding and blending system, most of the piping, etc.) of the system 10c being identical to the elements of the system 10 as described above.

In the illustrated example, the liquid extraction system 11c comprises a housing 42c including an outer housing assembly 46c and an inner housing assembly 48c. The inner housing assembly 48c (FIGS. 22, 23, 25, 26 and 27) includes an inner flat base panel 300 and an inner shell member 302. The inner flat base panel 300 and the inner shell member 302 have a side view profile that is substantially C-shaped with a closed end as illustrated in FIG. 25. The inner flat base panel 300 and the inner shell member 302 have the same peripheral dimensions. The inner flat base panel 300 includes a drive shaft opening 50c centrally located therein and an opening 304 connected to the filtrate drain 62c (which is therefore extending from a side of the liquid extraction system 11c instead of from a bottom of the liquid extraction system as in the first embodiment of the system 11). The inner shell member 302 includes a large central opening 306 thereby defining a C-shaped wall 301 and an end wall 303 in the inner shell member 302. The inner shell member also includes an inner peripheral groove 308 adjacent the large central opening 306. The inner peripheral groove 308 is configured to accommodate an outer flange 310 of the first side drive wheel 202c. The inner shell member 302 also includes an upwardly angled groove 312 and a downwardly angled groove 314 in the end wall 303 extending from a center 316 of the end wall 303. The upwardly angled groove 312 defines a side wall of the outlet of the liquid extraction system 11c and the downwardly angled groove 314 defines a side wall of the inlet of the liquid extraction system 11c. The outer housing assembly 46c is identical of the inner housing assembly 48c, except that the flat base panel does not include a drive shaft opening. Additionally, it is contemplated that the outside housing assembly 46c could have a window in the flat base panel 300.

The illustrated center seal 76c (FIG. 22-24) is positioned between the inner housing assembly 48c and the outer housing assembly 46c and defines an upper and lower boundary of the mass traveling through one of the liquid extraction presses 11c of the liquid extraction assembly 40c. The center seal 76c also defines the inlet and the outlet for the sludge through the liquid extraction press 11c. The center seal 76c includes an outer C-shaped portion 82c, a scraper portion 84c, a first inlet plate 86c and a second inlet plate 88c. The outer C-shaped portion 82c includes top section 90c and a bottom section 92c. The top section 90c includes a pair of grooves 94c configured to accept a top edge of the first inlet plate 86c and the second inlet plate 88c. The top section 90c of the outer C-shaped portion 82c includes an angled top surface 96c. The scraper portion 84c is located between the top section 90c and the bottom section 92c of the outer C-shaped portion 82c. The scraper portion 84c is identical to the scraper portion 84 discussed above. The outer C-shaped portion 82c is preferably made in two parts for easy shipping and includes a puzzle piece type connection 305 for connecting the two parts together (see FIG. 24).

In the illustrated example, a rotary screen assembly 200c surrounds the center seal 76c and assists in removing the liquid portion from the sludge. The rotary screen assembly 200c includes a first side drive wheel 202c, a first side slotted filter screen 204c, a second side slotted filter screen 208c and a second side drive wheel 210c. The first side drive wheel 202c and the second side drive wheel 210c are preferably identical, but in an opposite orientation. Likewise, the first side slotted filter screen 204c and the second side slotted filter screen 208c are preferably identical, but in an opposite orientation.

The illustrated first side drive wheel 202c and the second side drive wheel 210c each include an outer rim 212c, a plurality of spokes 214c and an inner rim 216c. The outer rim 212c and the inner rim 216c are substantially circular. The slotted screens 204c and 308c extend between the inner rim 216c and the outer rim 212c and are supported on a rear side by the plurality of spokes 214c. The plurality of spokes 214c also connect the outer rim 212c to the inner rim 216c.

Figure 30:
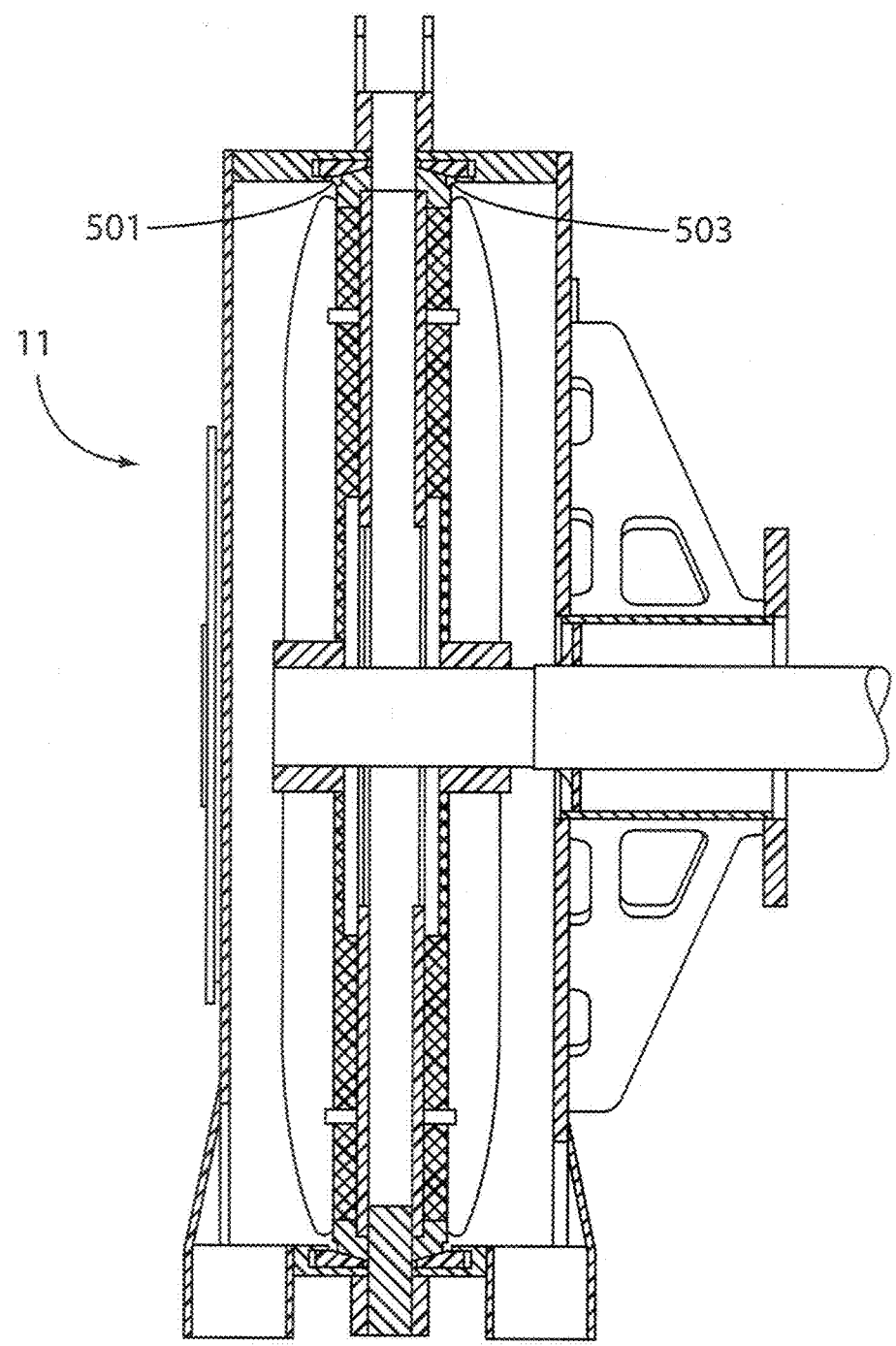
FIG. 30 is a cross-sectional view of a liquid extraction press showing use of a charging plate.

In the illustrated example, the center seal 76a includes a C-shaped charging plate 500 along the inner face of the center seal 76a. The C-shaped charging plate 500 is configured to be connected to a volt power supply (e.g., at 48 volts) (e.g., DC, AC or three-phase) to provide a charge to the C-shaped charging plate 500. The charge on the C-shaped charging plate 500 applies a positive charge to the mass forced through the liquid extraction assembly and a negative charge on the rotating screens, thereby drawing the mass towards the rotating screens to improve the extraction rate of the liquid from the mass. As illustrated in FIG. 30, the liquid extraction press 11 could include a negative contact pin 501 at a first edge of the C-shaped charging plate 500 and a positive contact pin 503 at a second edge of the C-shaped charging plate 500 to create the charge across the C-shaped charging plate 500.

Figure 31:
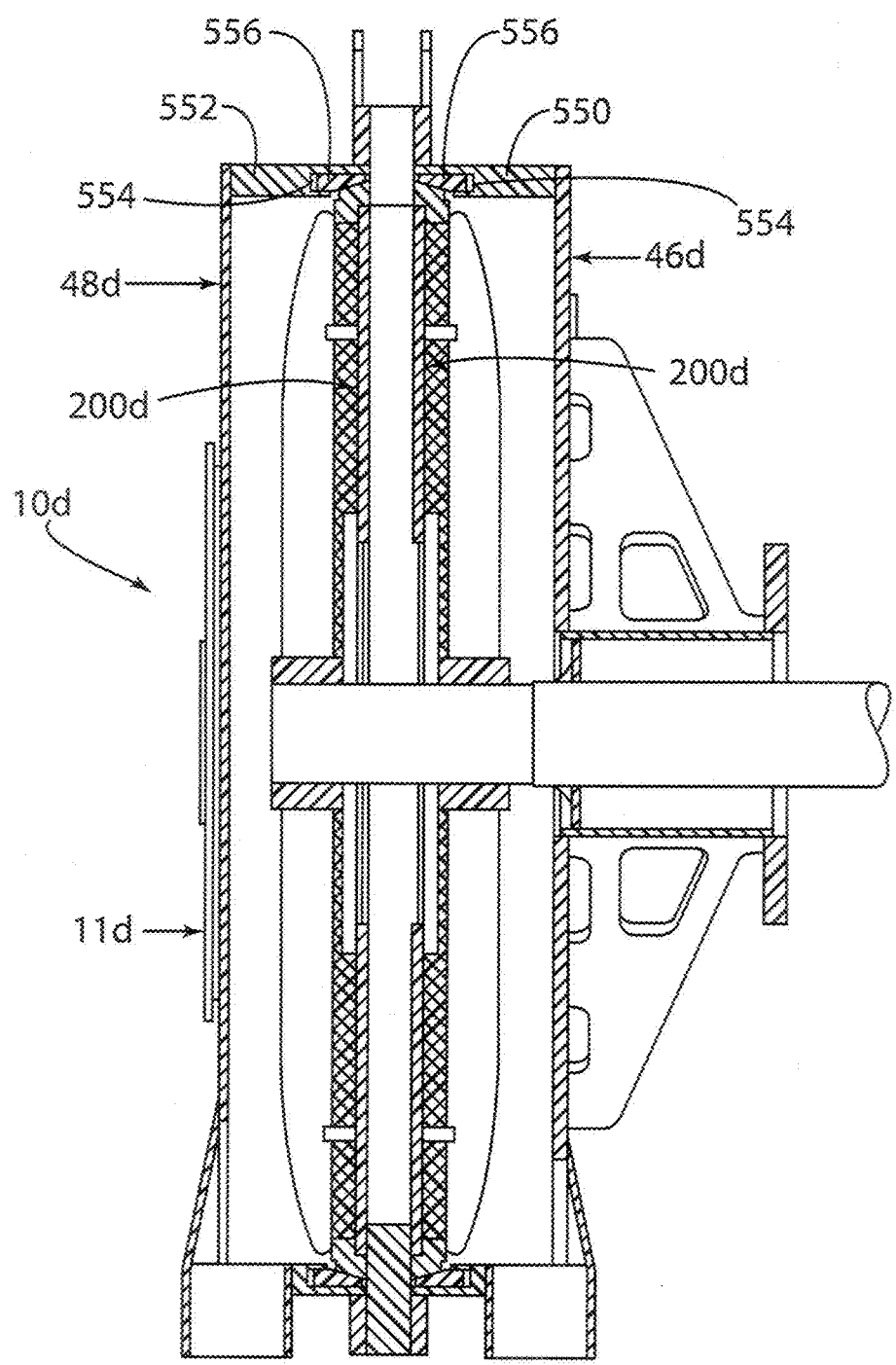
FIG. 31 is a partial front view of a fourth embodiment of the system for extracting liquid from a mass of the present invention.
Figure 32:
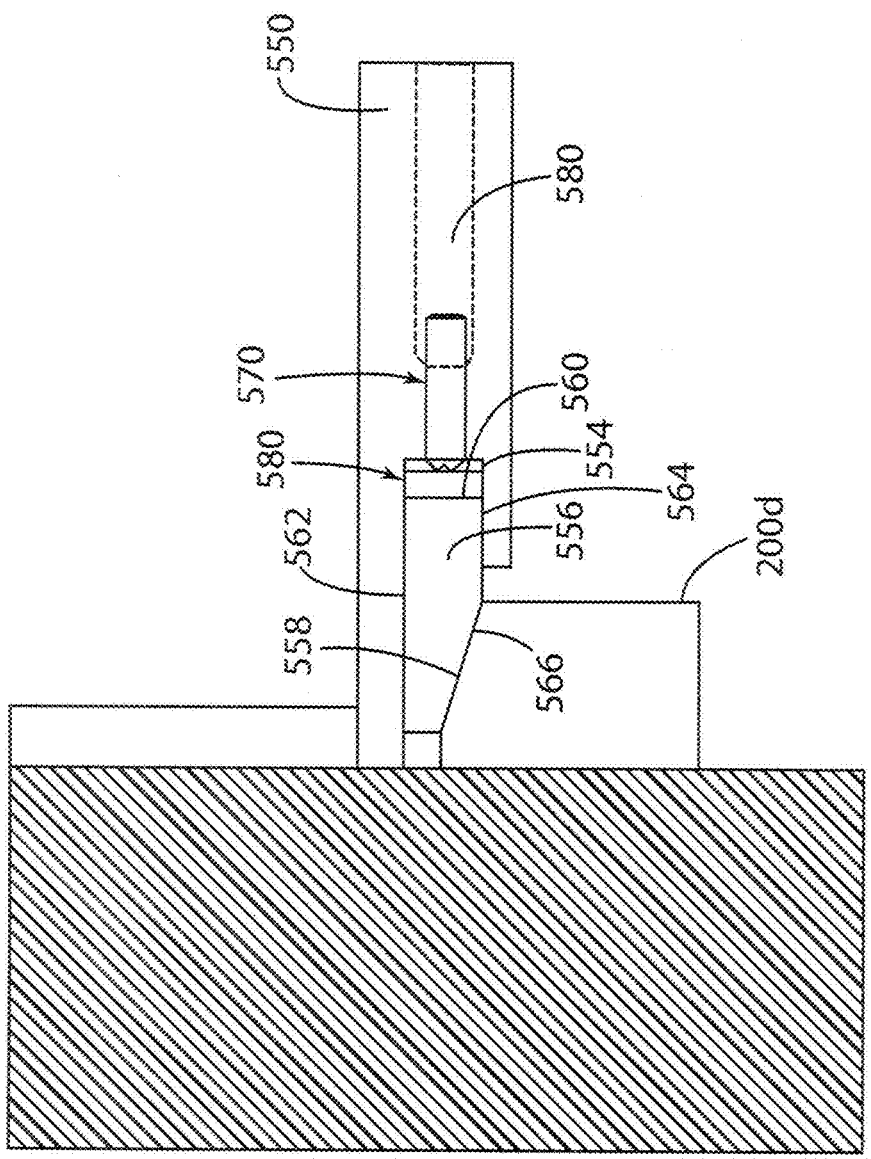
FIG. 32 is an enlarged view of the fourth embodiment of the system for extracting liquid from a mass of the present invention showing a seal, a rotating screen assembly and a housing of the fourth embodiment of the system for extracting liquid from a mass.
Figure 36:
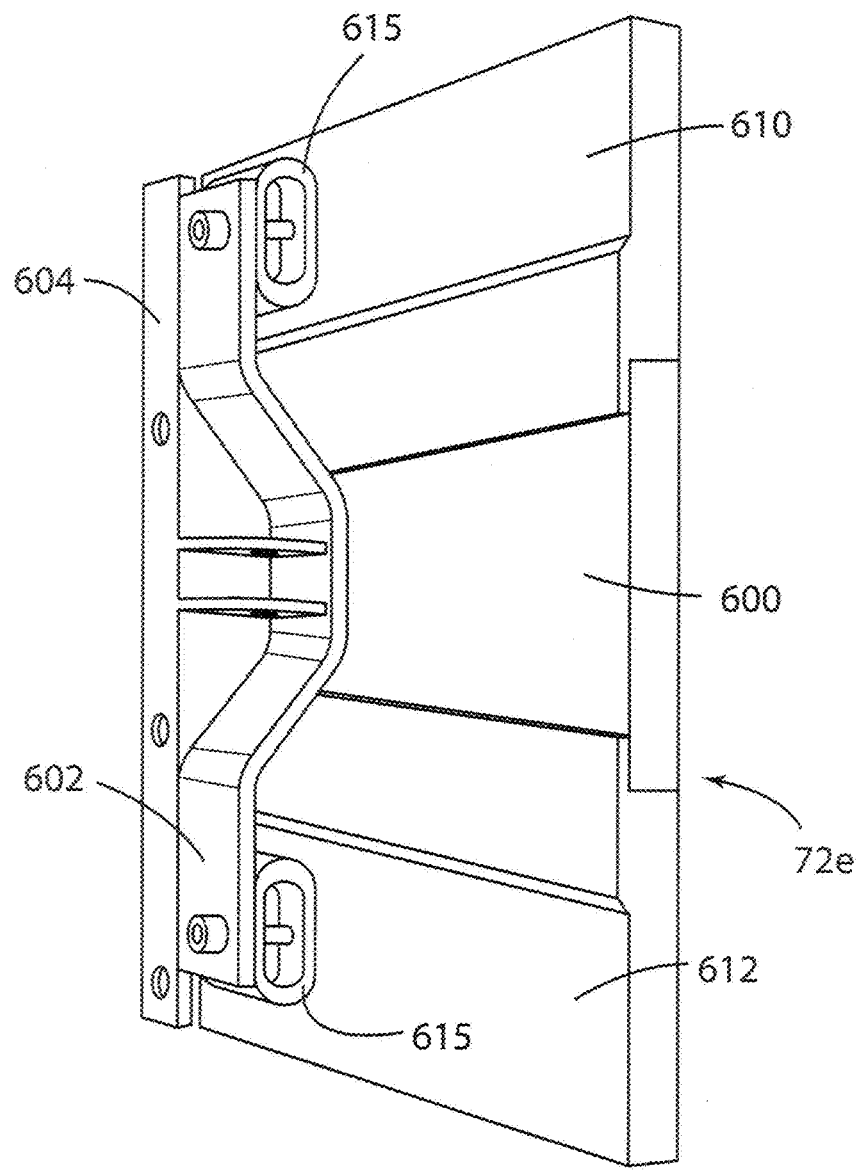
FIG. 36 is a perspective view of a divided wall of the fifth embodiment of the system for extracting liquid from a mass of the present invention in a closed position.
Figure 37:
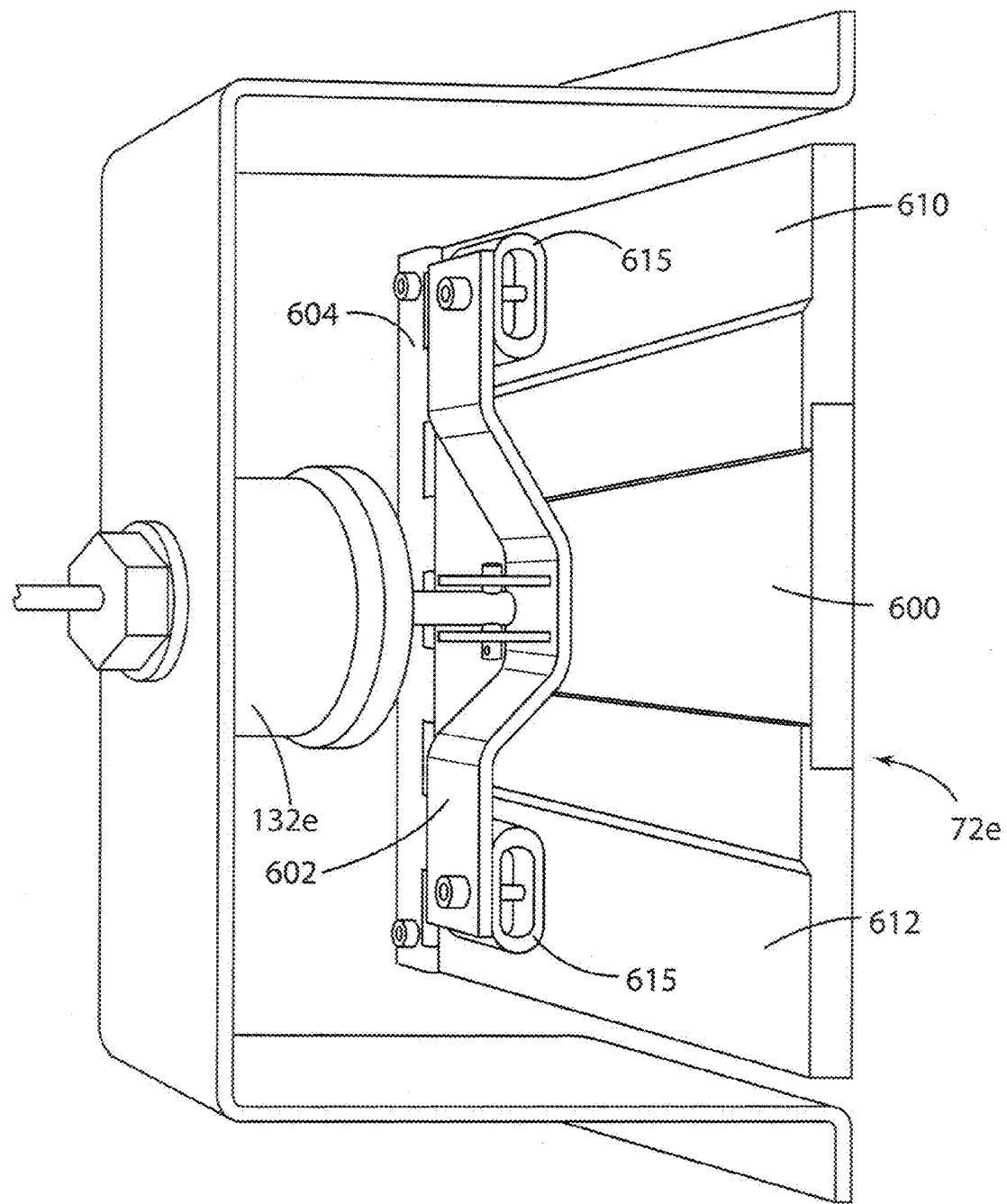
FIG. 37 is a perspective view of a divided wall of the fifth embodiment of the system for extracting liquid from a mass of the present invention in a closed position.

The reference number 10d (FIGS. 31-33B) generally designates another embodiment of the present invention, having a fourth embodiment for the system for extracting liquid from a mass. Since the system 10d is similar to the previously described system 10c, similar parts appearing in FIGS. 22-29 and FIGS. 31-33B, respectively, are represented by the same, corresponding reference number, except for the suffix "d" in the numerals of the latter. In the fourth embodiment of the system 10d, the liquid extraction presses 11d includes an inner housing 46d with an outer wall 550 and an outer housing 48d with an outer wall 552. The outer walls 500, 552 of the inner housing 46d and the outer housing 48d each include an inwardly facing groove 554 with a seal 556 therein. The seals 556 are configured to abut an outer edge 558 of the rotating screens 200d, thereby sealing the mass travel passages through the liquid extraction press 11d. As illustrated in FIGS. 31, 32 and 33B, the seal 556 includes a wedge-shaped cross-section with an outer side 560, a top side 562, a bottom side 564 and an angled abutment side 566. The angled abutment side 566 abuts against the outer edge 558 of the rotating screens 200d along all or a substantial portion of the outer edge 558. The seals 556 can be made of any sealing material. For example, the seals 556 can be made of Robatec-SA (a vulcanized Rubber Graphite based compound having a hardness of 75 Shore D and a specific gravity of approx. 1.5).

In the illustrated embodiment, portions of the seals 556 can be forced into engagement or allowed to move away from the outer edge 558 of the rotating screens 200d via at least one pressing device 570 that abuts against the outer side 560 of the seal 556. The pressing device 570 can comprise a plurality of screws 572 (e.g., Allen set screws) located in a hole 580 in the outer walls 550, 552 that are accessible from the outside of the housing and that press against the outer side 560 of the seal 556 at several points on the circumference of the seal 556. The pressing devices 570 can be selectively actuated to force the outer side 560 of the seal 556 inward, thereby forcing the angled abutment side 566 of the seals 556 into engagement with the outer edge 558 of the rotating screens 200d. Alternatively, the pressing devices 570 can be selectively actuated to allow the outer side 560 of the seal 556 to move outward, thereby allow the angled abutment side 566 of the seals 556 to move away from the outer edge 558 of the rotating screens 200d. With a plurality of pressing devices 570, the mass travel passages of the liquid extraction presses 11d can be securely sealed. It is contemplated that a band 580 can be positioned between the pressing device 570 and the seal 556 as illustrated in FIG. 32. However, such a band 580 is not required and the pressing devices 570 can directly abut the seal 556. It is further contemplated that other pressing devices 570 could be employed (e.g., linear actuators). It is noted that any number of the pressing devices 570 can be actuated to form a tighter seal along any portion of the seal 556 at different areas of the circumference of the seal 556.

FIG. 32A illustrates an alternative to the embodiment illustrated in FIGS. 31, 32, 33A and 33B, wherein instead of having a band 580 being pressed against the seal 556 by a plurality of pressing devices 570, a circular inflatable tube 581 having at least one inlet tube 583 presses against the seal 556. The inflatable tube 581 is inflated with air through the at least one inlet tube 583 to press against the seal 556.

The reference number 10e (FIGS. 34-37) generally designates another embodiment of the present invention, having a fifth embodiment for the system for extracting liquid from a mass. Since the system 10e is similar to the previously described system 10c, similar parts appearing in FIGS. 22-29 and FIGS. 34-37, respectively, are represented by the same, corresponding reference number, except for the suffix "e" in the numerals of the latter. In the fifth embodiment of the system 10e, the liquid extraction press 11e includes a divided side wall 72e. The divided side wall 72e includes a center portion 600 configured to interact with the air bellows 132e via a pressing bar 602. As the air bellows 132e is actuated, the pressing bar 602 presses against the center portion 600 to rotate the center portion 600 along a hinge 604 to constrict the outlet of the liquid extraction press 11e as discussed above. The pressing bar 602 will also press against a top portion 610 and a bottom portion 612 of the divided side wall 72e via a biasing member 615 (e.g., a rubber cylinder). It has been noted that the mass traveling though the outlet travels faster in the center area of the outlet than at the top and bottom of the outlet. The divided side wall 72e allows the center area of the outlet to be more constricted that the top and bottom of the outlet, such that the mass leaving the liquid extraction press 11e leaves at the same speed at the top, center and bottom. The biasing member 615 is configured to be compressed by the mass exiting the outlet, thereby allowing the top portion 610 and the bottom portion 612 to rotate about the hinge 604, thereby allowing the mass to exit the liquid extraction press 11e all at substantially the same speed (since the center is constricted more than the top and bottom, the speed of the mass will even out along a vertical direction).

The reference number 10f (FIGS. 38-52) generally designates another embodiment of the present invention, having a sixth embodiment for the system for extracting liquid from a mass. Since the system 10f is similar to the previously described system 10, similar parts appearing in FIGS. 1-37 and FIGS. 38-52, respectively, are represented by the same, corresponding reference number, except for the suffix "f" in the numerals of the latter instead of no alphabetical suffix or another letter suffix. In the sixth embodiment of the system 10f, the liquid extraction presses 11f and everything therein is orientated upside-down (as in the second embodiment of the system 10b), such that the inlet to the liquid extraction press 11f is located below the outlet of the liquid extraction press 11f and the mass will move upwardly through the liquid extraction press 11f. However, the filtrate drain 62f will continue to be located at a bottom of the liquid extraction presses 11f, such that liquid will continue to be able to be drained out of the liquid extraction presses 11f. Furthermore, the liquid extraction press 11f will have a slightly different configuration as discussed below (although the liquid extraction press 11f will continue to function the same as the liquid extraction press 11b). It is noted that FIG. 38 is a partial drawing of the system 10f only showing the liquid extraction assembly 40f and the motor assembly 44f, with the remaining elements (the platform, the system mass input, the polymer feeding and blending system, most of the piping, etc.) of the system 10f being identical to the elements of the system 10 as described above.

In the illustrated example, the system 10f includes an outer housing shell 46f and an inner housing shell 48f surrounding seals 581 (see FIGS. 41A-B), a rotary screen assembly 200f and a center seal 76f. The system 10f includes at least one of the following four features: (1) an inlet 900 for inflating the tube 581 as discussed above in regard to FIG. 32A (FIGS. 38-41B); (2) a two-part center seal 76f with a rotating top end 1000 (FIGS. 42-45); (3) a rotating center hub/spacer 206f with a scraper groove 2000 (FIGS. 46-47B); and (4) an inlet nozzle 3000 (FIGS. 48-52).

Figure 38:
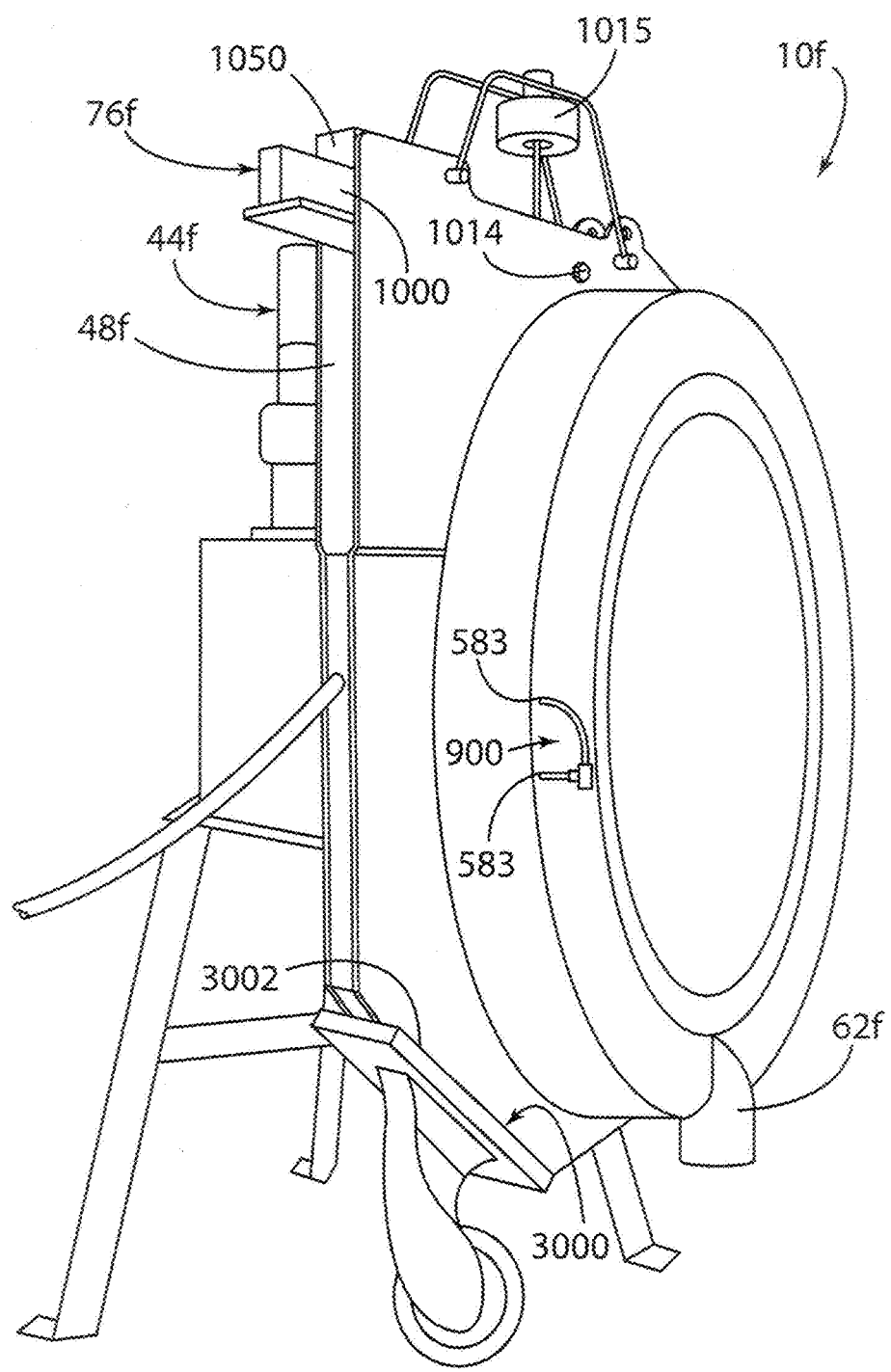
FIG. 38 is a partial front perspective view of a sixth embodiment of the system for extracting liquid from a mass of the present invention.
Figure 39:
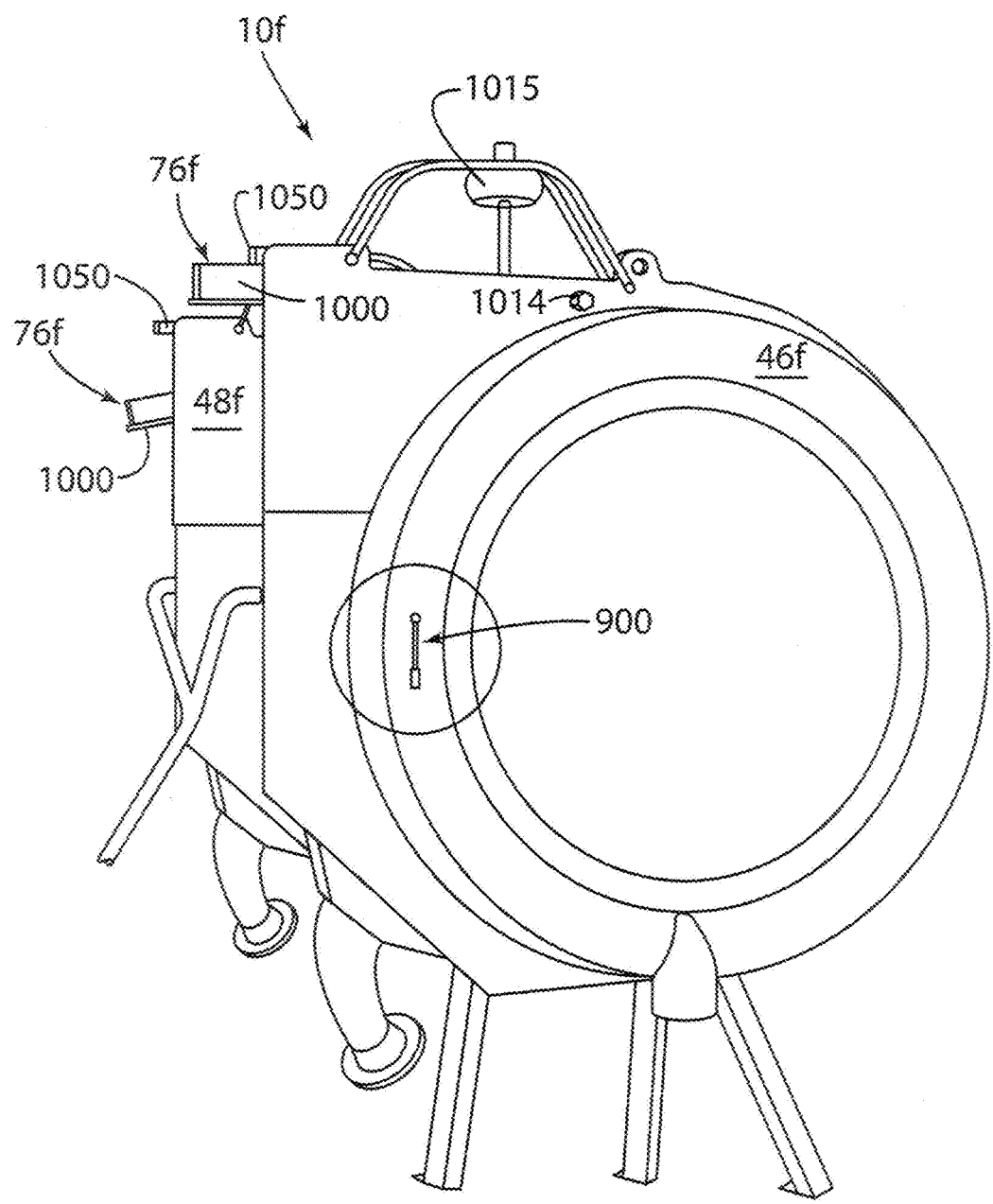
FIG. 39 is a partial side view of the sixth embodiment of the system for extracting liquid from a mass of the present invention.
Figure 40:
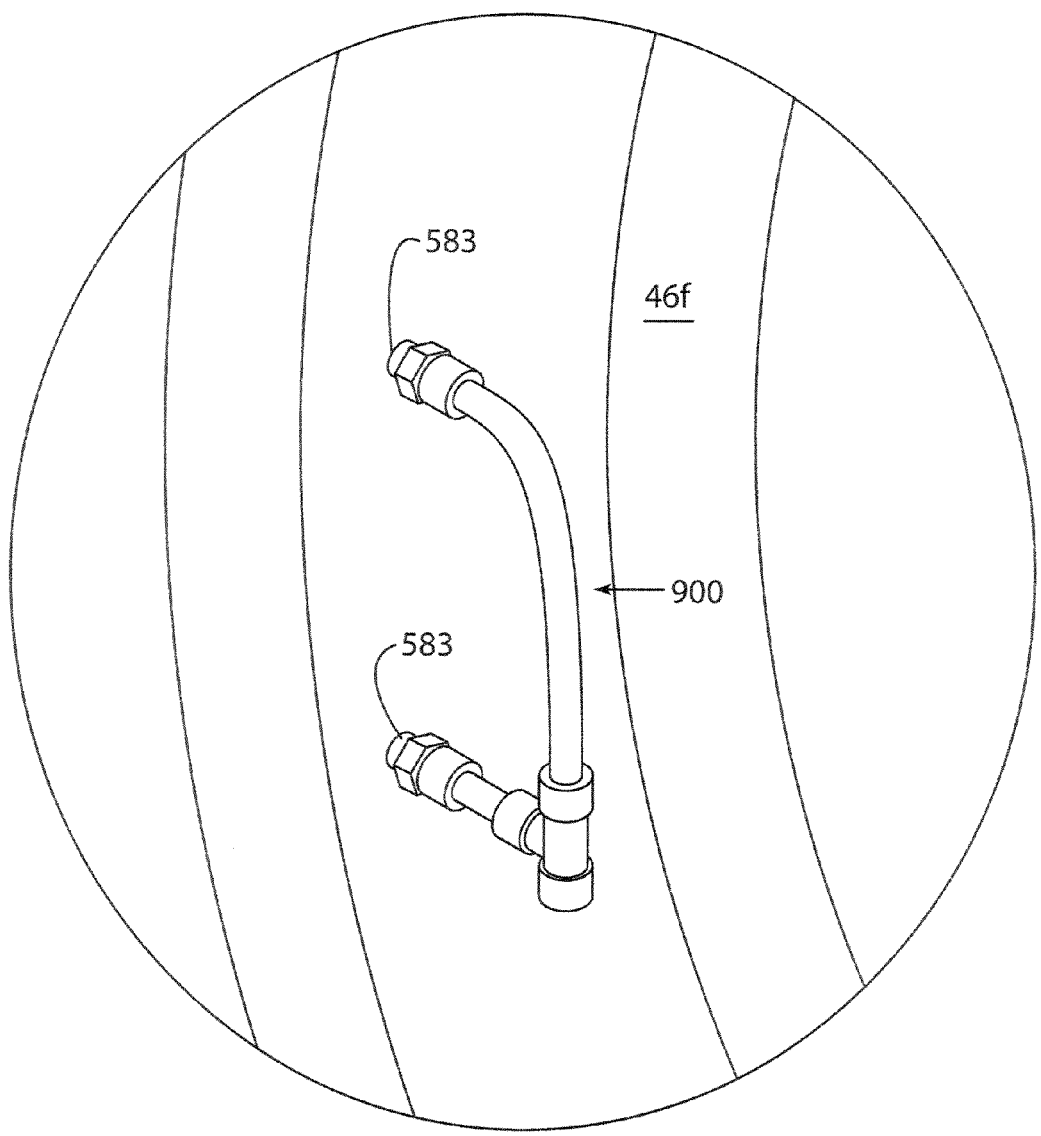
FIG. 40 is a close-up view of an inlet to an inflatable tube of the sixth embodiment of the system for extracting liquid from a mass of the present invention.
Figure 41B:
FIG. 41B is a cross-sectional view of the seal of the sixth embodiment of the system for extracting liquid from a mass of the present invention.
Figure 41A:
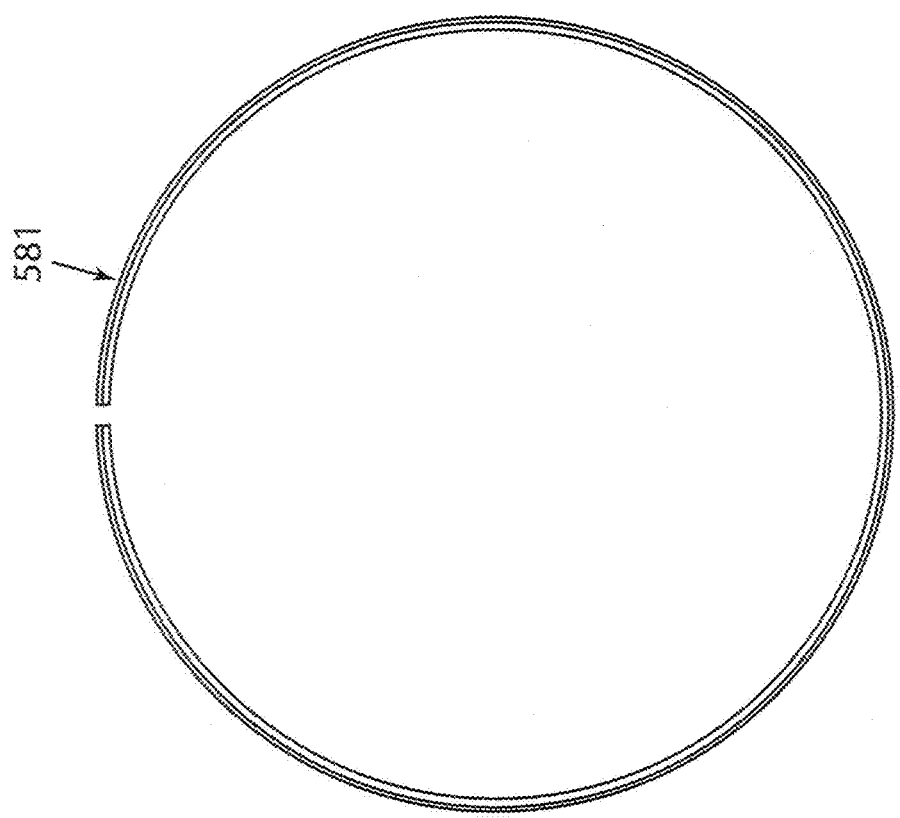
FIG. 41A is a side view of the seal of the sixth embodiment of the system for extracting liquid from a mass of the present invention.

The illustrated inlet 900 for inflating the inflatable tube 581 as discussed above in regard to FIG. 32A (FIGS. 38-41B) is connected to a pair of the inlet tubes 583 as illustrated in FIGS. 38-40. A source of air (or other gas) under pressure is configured to be connected to the inlet 900 to provide air (or other gas) under pressure to the inflatable tube 581 to inflate the inflatable tube 581. The inlet 900 can also be used as an outlet to release the air (or other gas) under pressure from the inflatable tube 581 via the inlet tubes 583.

Figure 42:
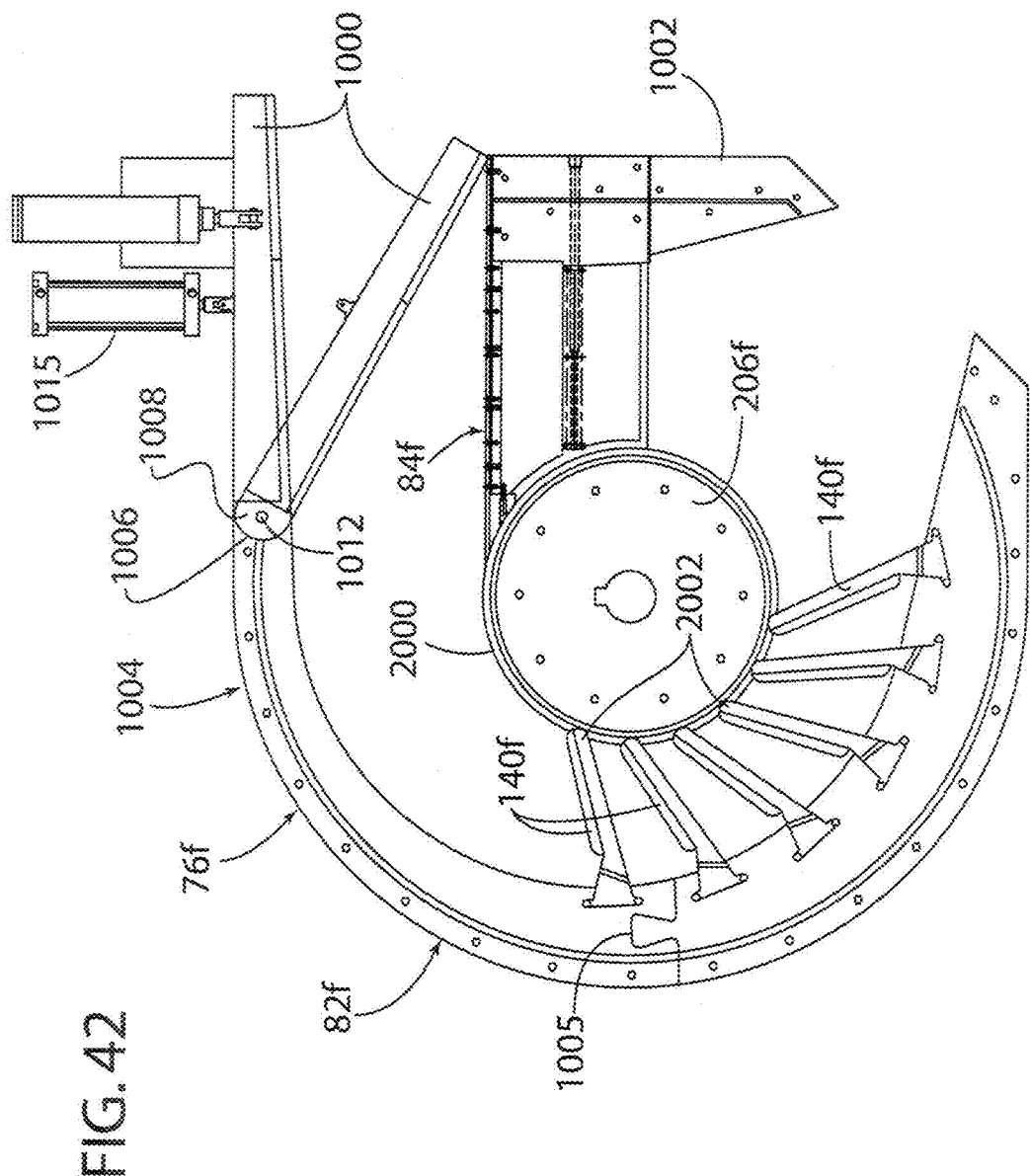
FIG. 42 is a side view of a liquid extraction assembly of the sixth embodiment of the system for extracting liquid from a mass of the present invention with the walls removed.
Figure 43:
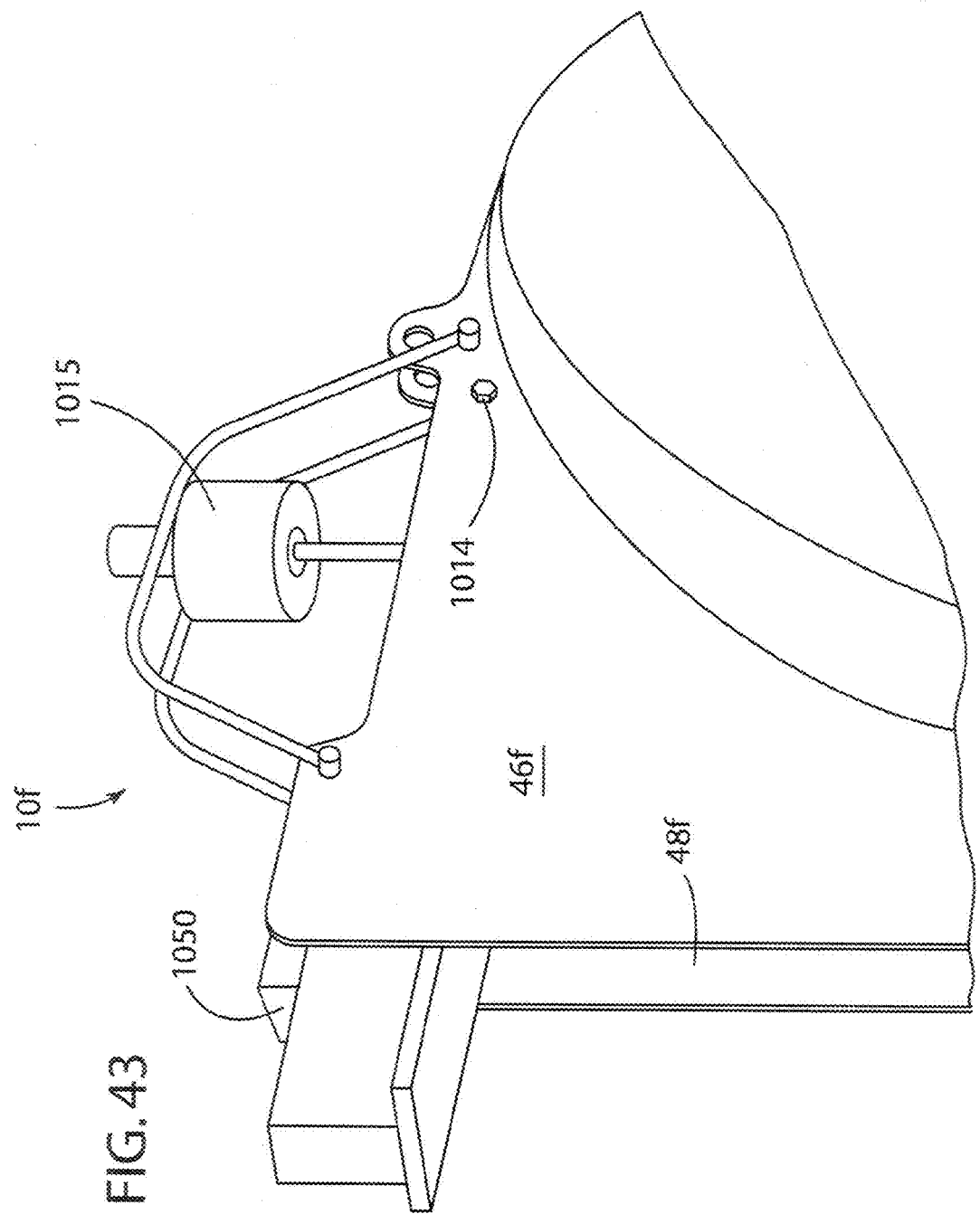
FIG. 43 is a first close-up upper perspective view of the liquid extraction assembly of the sixth embodiment of the system for extracting liquid from a mass of the present invention.
Figure 44:
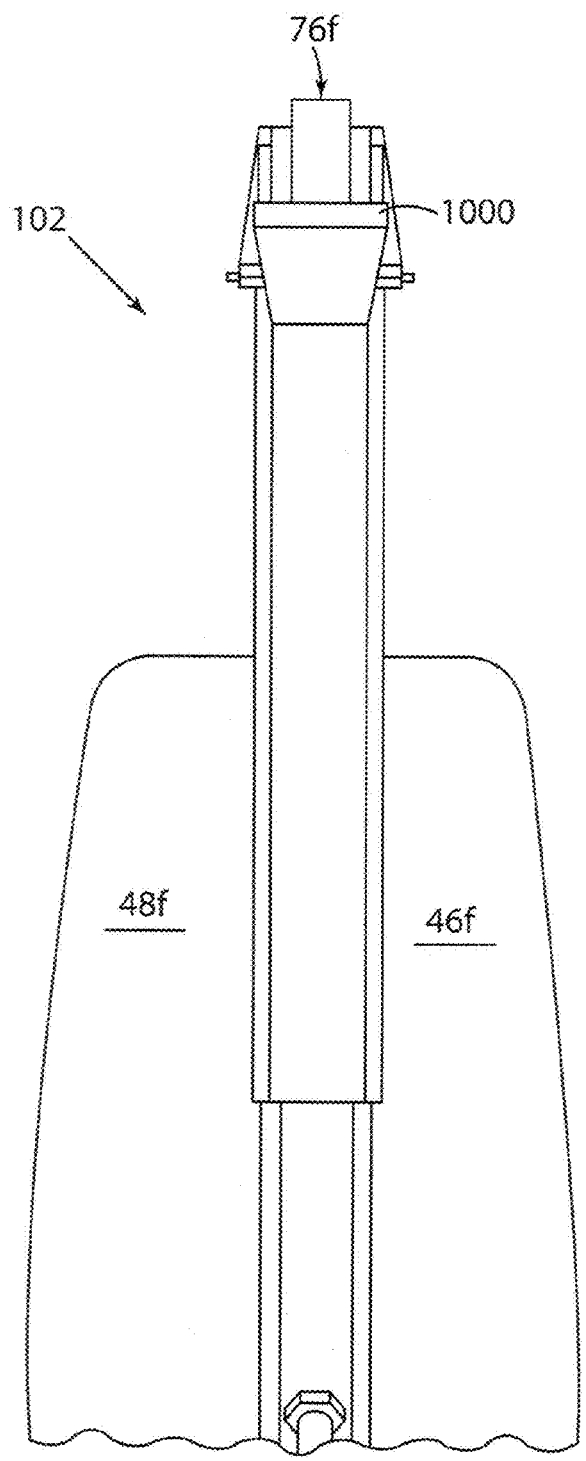
FIG. 44 is a close-up upper front view of the liquid extraction assembly of the sixth embodiment of the system for extracting liquid from a mass of the present invention.
Figure 45:
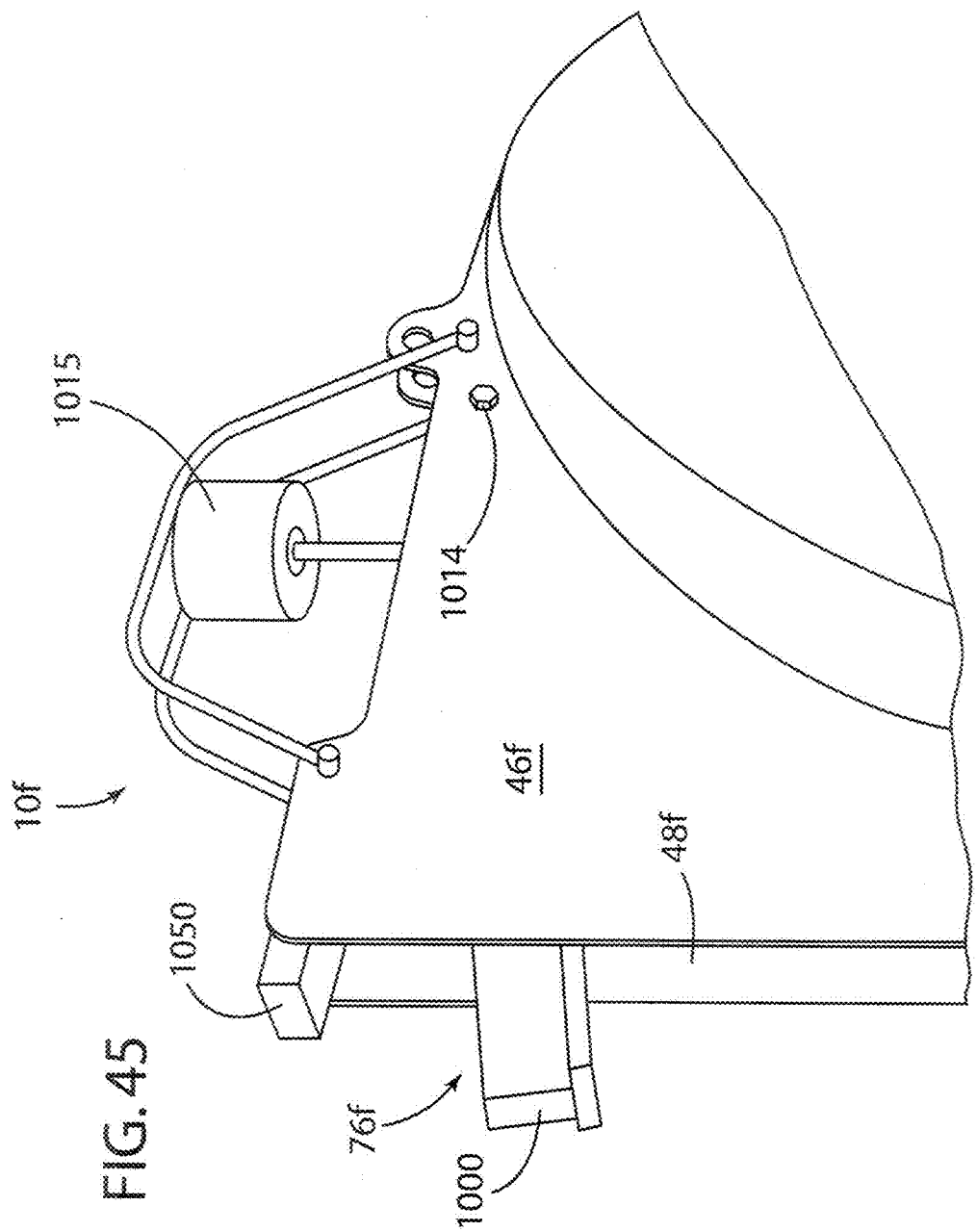
FIG. 45 is a second close-up upper perspective view of the liquid extraction assembly of the sixth embodiment of the system for extracting liquid from a mass of the present invention.

In the illustrated example, the two-part center seal 76f with the rotating top end 1000 (FIGS. 42-45) is positioned between the inner housing assembly 48f and the outer housing assembly 46f and defines an upper and lower boundary of the mass traveling through one of the liquid extraction presses 11f. The center seal 76f also defines a portion of the inlet and the outlet for the sludge through the liquid extraction press 11f. The center seal 76f includes an outer C-shaped portion 82f, a scraper portion 84f and an inlet extension 1002. The outer C-shaped portion 82f comprises a main static section 1004 and the rotating top end 1000. The main static section 1004 can be made in two parts for easy shipping by including a puzzle piece type connection 1005 for connecting the two parts together (see FIG. 42). A top end of the main static section 1004 includes a rounded edge surface 1006. The rotating top end 1000 includes a rounded end 1008 configured to engage with the rounded edge surface 1006 of the main static section 1004 and an inverted T-shaped end 1010. As illustrated in FIG. 42, the rounded end 1008 of the rotating top end 1000 pivots about a pivot point 1012 (via a pin 1014 extending through the inner housing assembly 48f, the outer housing assembly 46f and the pivot point 1012 of the rounded end 1008). Furthermore, as also illustrated in FIG. 42, the rotating top end 1000 is used to constrict the outlet by using an actuator 1015 connected the inverted T-shaped end 1010 of the rotating top end 1000. The liquid extraction press 11f can include an abutment plate 1050 for preventing upward movement of the rotating top end 1000 (see FIGS. 38, 39, 43 and 45). While only the rotating top end 1000 is used to constrict the outlet in the illustrated example, it is contemplated that the side wall of the outlet can be used to constrict the outlet as discussed above. The scraper portion 84f is substantially similar to the scraper portion 84 discussed above.

Figure 46:
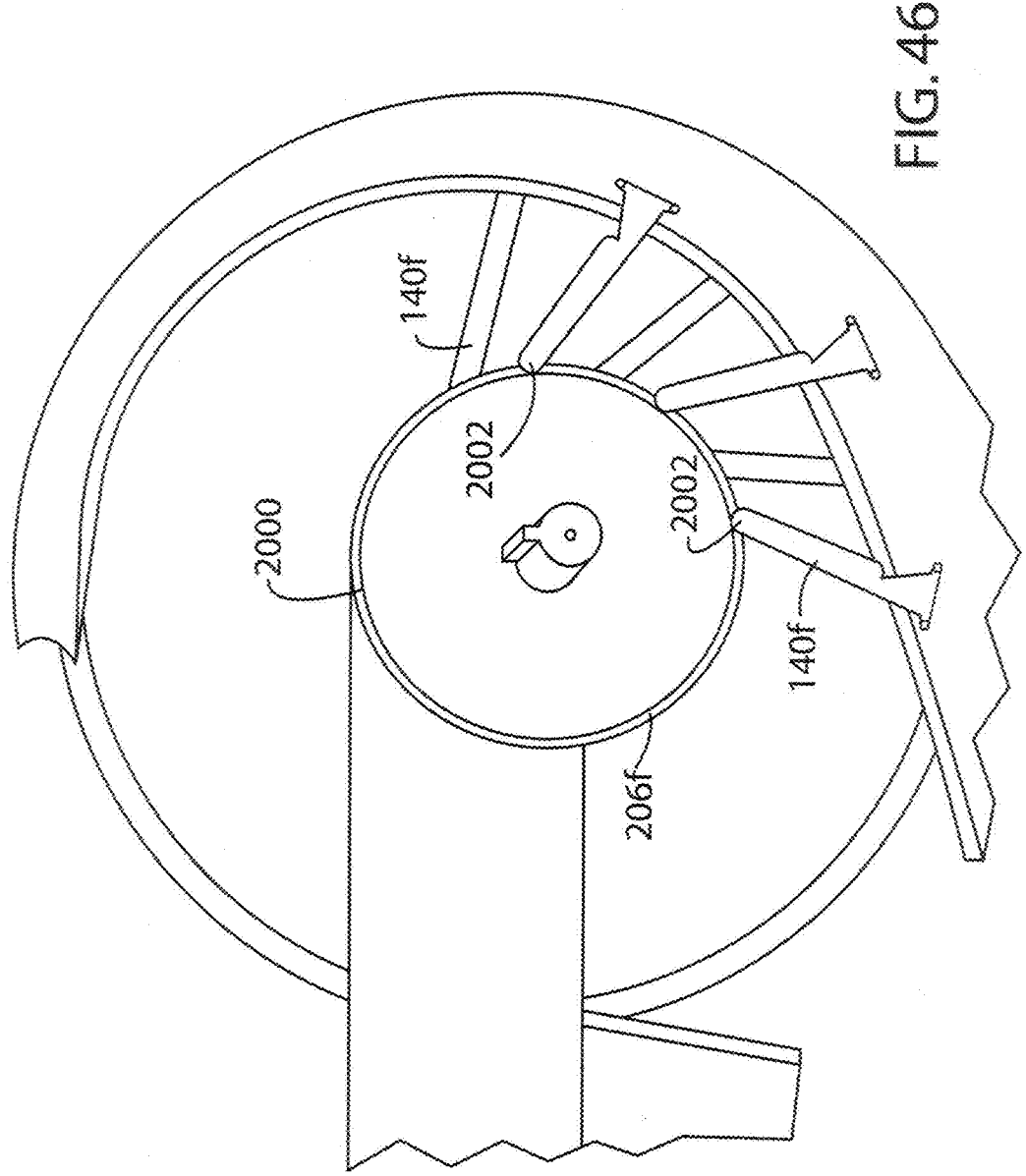
FIG. 46 is a first partial side view of the liquid extraction assembly of the sixth embodiment of the system for extracting liquid from a mass of the present invention showing a center seal with scraper grooves.
Figure 47:
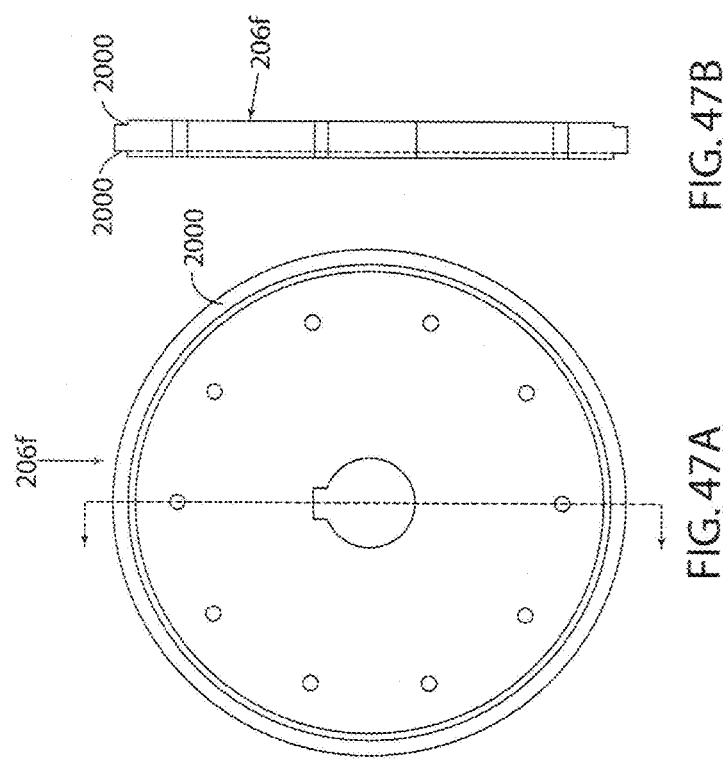
FIG. 47A is a side view of a center seal with scraper grooves of the liquid extraction assembly of the sixth embodiment of the system for extracting liquid from a mass of the present invention.
FIG. 47B is an end view of a center seal with scraper grooves of the liquid extraction assembly of the sixth embodiment of the system for extracting liquid from a mass of the present invention.
Figure 48:
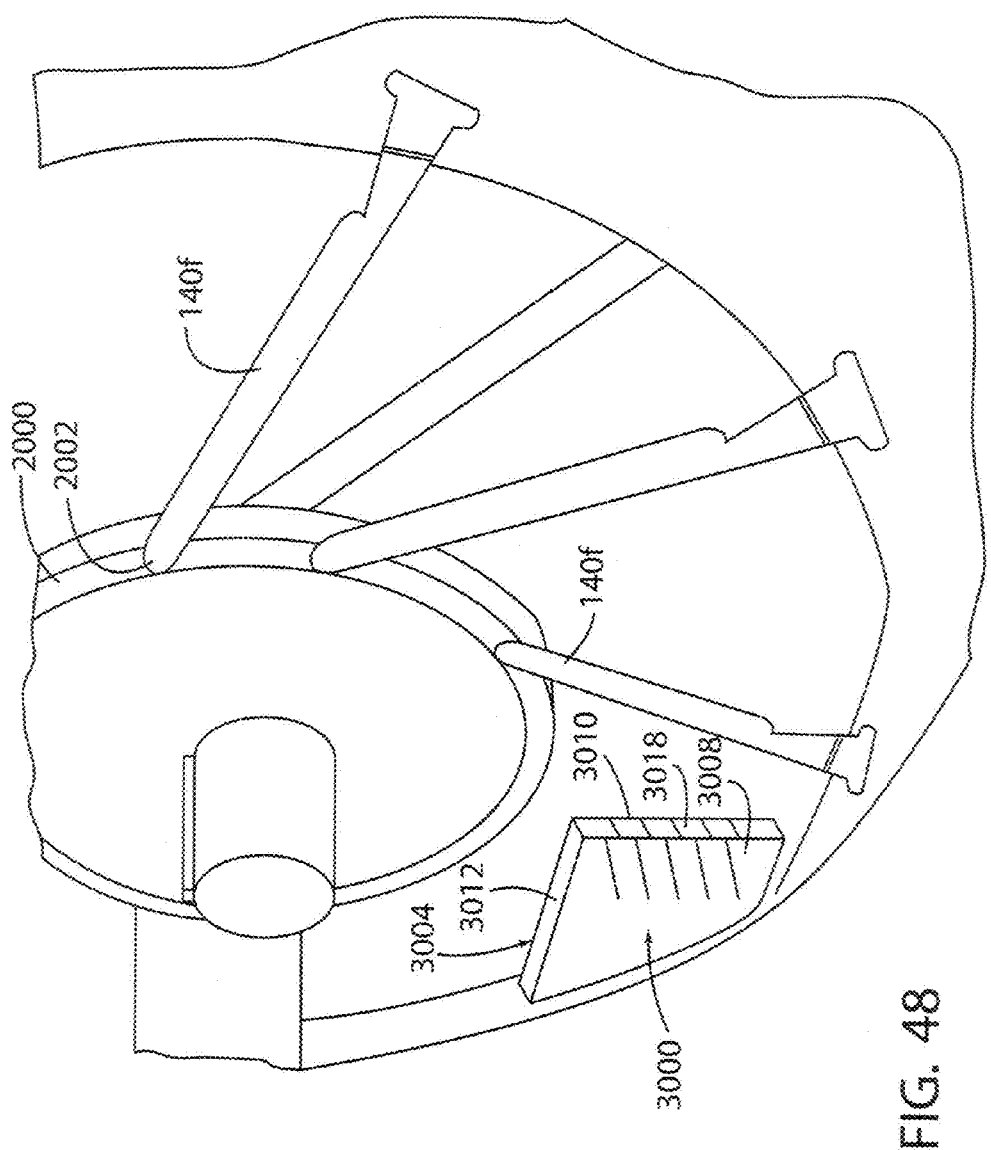
FIG. 48 is a first partial side view of the liquid extraction assembly of the sixth embodiment of the system for extracting liquid from a mass of the present invention showing a nozzle.

As illustrated in FIGS. 42, 46 and 48, a plurality of scrapers 140f extend from the main static section 1004 of the outer C-shaped portion 82f of the center seal 76f. The scrapers 140f extend along the entire height of the path of the mass and extend into the rotating center hub/spacer 206f. The rotating center hub/spacer 206f includes a pair of scraper grooves 2000 on a periphery thereof for accommodating the ends 2002 of the scrapers 140f to allow the scrapers 140f to extend along the entire height of the path of the mass.

Figure 49:
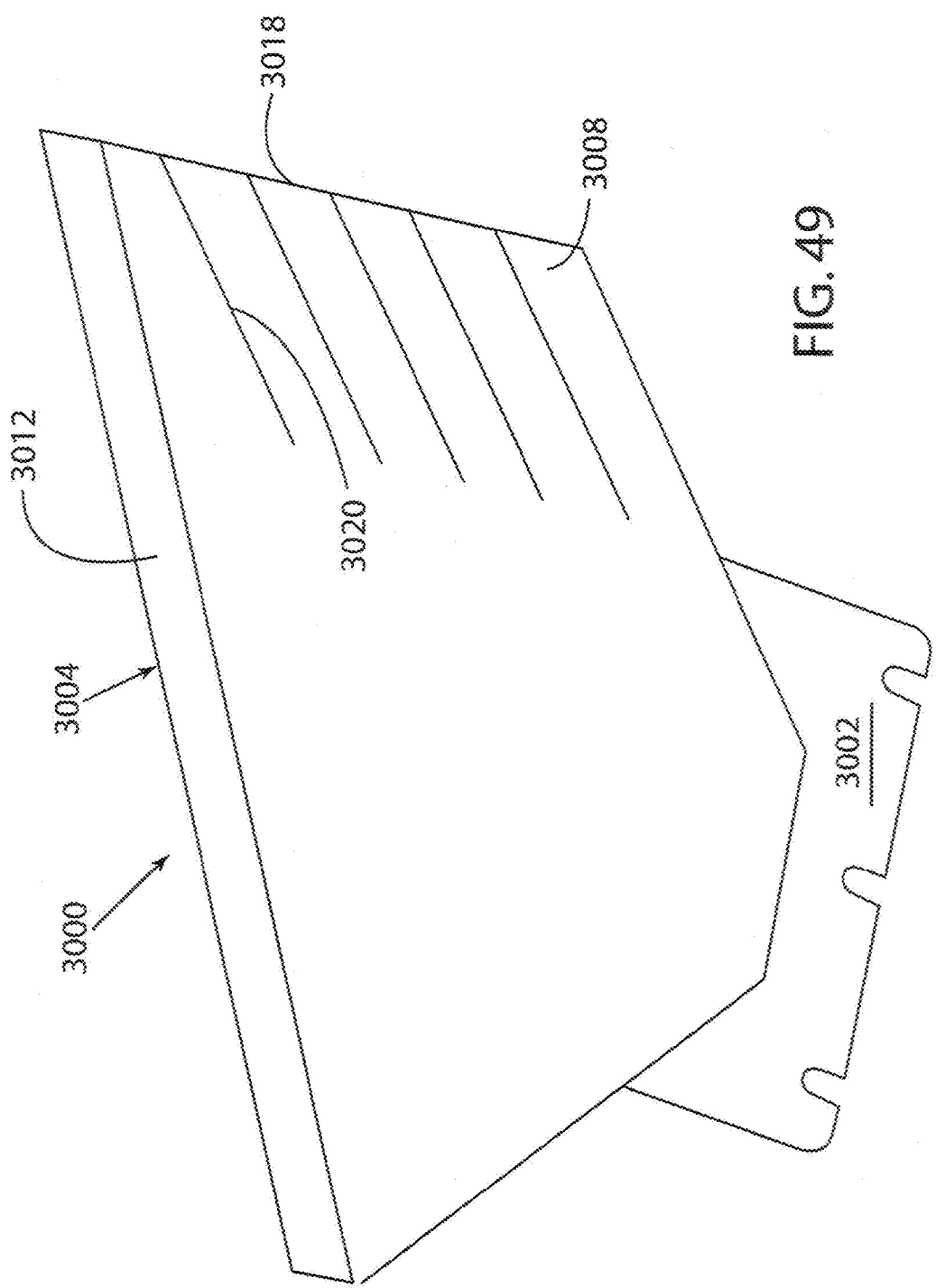
FIG. 49 is a top perspective view of the nozzle of the liquid extraction assembly of the sixth embodiment of the system for extracting liquid from a mass of the present invention.

As illustrated in FIGS. 38, 39 and 48 the inlet to the liquid extraction press 11f includes an inlet nozzle 3000 for forcing the mass into the liquid extraction press 11f. The inlet nozzle 3000 includes a base plate 3002 and a nozzle housing 3004 extending from the base plate 3002. The nozzle housing 3004 comprises a first side wall 3008, a second side wall 3010, a top wall 3012 and a bottom wall 3014. The nozzle housing 3004 also includes an entrance 3016 in the base plate 3002 and an exit 3018. The entrance 3016 is larger than the exit 3018, thereby forming the nozzle. FIG. 48 illustrates a first configuration of the inlet nozzle 3000, FIG. 49 illustrates a second configuration of the inlet nozzle 3000, and FIGS. 50-52 illustrate a fourth configuration of the inlet nozzle 3000. In all of the configurations of the inlet nozzle 3000, the mass exits the inlet nozzle 3000 is a direction substantially parallel to a tangent to the path of the mass through the liquid extraction press 11f. As illustrated in FIGS. 49-52, the inlet nozzle 3000 can include slots 3020 in the first side wall 3008 and/or the second side wall 3010 to allow the first side wall 3008 and/or the second side wall 3010 to flex to relive pressure in the nozzle housing 3004. As illustrated in FIG. 38, the base plate 3002 is connected to the inner housing assembly 48f and the outer housing assembly 46f to connect the inlet nozzle 3000 to the liquid extraction press 11f.

It is to be understood that variations and modifications can be made on the aforementioned structure without departing from the concepts of the present invention, and further it is to be understood that such concepts are intended to be covered herein unless expressly stated otherwise. For example, the C-shaped charging plate 500, the seal 556 and the divided side wall 72e could be used in any of the liquid extraction assemblies described herein to improve the extraction rate of the liquid from the mass. Furthermore, the third embodiment of liquid extraction press 11c could be right-side up with the outlet below the inlet. Moreover, it is to be understood that such concepts are intended to be covered by the following claims unless these claims by their language expressly state otherwise.

We claim:
1. A liquid extraction assembly for extracting liquid from a mass comprising:
a housing having an inlet and an outlet;
the housing further including a path between the inlet and the outlet;
the housing being configured to have the mass forced into the inlet to move the mass from the inlet to the outlet;
the housing including a rotating screen adjacent the path, the rotating screen defining one wall of the path;
the rotating screen including a plurality of openings located at the path;
wherein pressure from mass forced into the input presses the mass against the openings of the rotating screen to thereby force at least a portion of liquid in the mass to pass through the openings of the rotating screen;
the housing including an inflatable member providing a seal adjacent the rotating screen for maintaining the mass in the path, the inflatable member abutting a side face of the rotating screen adjacent an outer peripheral edge of the rotating screen.

2. The liquid extraction assembly of claim 1, wherein:
the housing includes a center seal rotating with the rotating screen and at least one fixed scraper in the path and adjacent the rotating screen, the at least one fixed scraper cleaning the rotating screen as the rotating screen is rotated past the at least one fixed scraper; and
the center seal includes a groove for accepting a tip of the at least one fixed scraper therein.

3. The liquid extraction assembly of claim 1, wherein:
the inlet is located below the outlet; and
the housing includes a pair of side walls and an annular seal located between the pair of side walls, the annular seal defining an outer periphery of the path, the annular seal having a rotating top end portion allowing an area of the outlet to change.

4. The liquid extraction assembly of claim 1, wherein:
the rotating screen and the inflatable member are circular.

5. A liquid extraction assembly for extracting liquid from a mass comprising:
a housing having an inlet and an outlet;
the housing further including a path between the inlet and the outlet;
the housing being configured to have the mass forced into the inlet to move the mass from the inlet to the outlet;
the housing including a rotating screen adjacent the path, the rotating screen defining one wall of the path;
the rotating screen including a plurality of openings located at the path;
wherein pressure from mass forced into the input presses the mass against the openings of the rotating screen to thereby force at least a portion of liquid in the mass to pass through the openings of the rotating screen;
the housing including a center seal rotating with the rotating screen and at least one fixed scraper in the path and adjacent the rotating screen, the at least one fixed scraper cleaning the rotating screen as the rotating screen is rotated past the at least one fixed scraper;
the center seal including a groove for accepting a tip of the at least one fixed scraper therein;
the center seal forming a wall of the path and abutting the mass moving through the assembly; and
the groove is at a junction between an outer side face and a peripheral cylindrical face of the center seal.

6. The liquid extraction assembly of claim 5, wherein:
the inlet is located below the outlet; and
the housing includes a pair of side walls and an annular seal located between the pair of side walls, the annular seal defining an outer periphery of the path, the annular seal having a rotating top end portion allowing an area of the outlet to change.

* * * * *